US008600882B2

(12) United States Patent
Summerrow et al.

(10) Patent No.: US 8,600,882 B2
(45) Date of Patent: Dec. 3, 2013

(54) PREPAID CARD BUDGETING

(75) Inventors: Kimberly Belle Summerrow, Charlotte, NC (US); Jeffrey Norman Healy, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 122 days.

(21) Appl. No.: 13/157,135

(22) Filed: Jun. 9, 2011

(65) Prior Publication Data

US 2012/0239564 A1 Sep. 20, 2012

Related U.S. Application Data

(60) Provisional application No. 61/454,386, filed on Mar. 18, 2011.

(51) Int. Cl.
*G06Q 40/00* (2012.01)

(52) U.S. Cl.
USPC .............................................. 705/39; 705/35

(58) Field of Classification Search
USPC ....................................... 705/39, 35
See application file for complete search history.

(56) References Cited

U.S. PATENT DOCUMENTS

| 7,254,548 B1 * | 8/2007 | Tannenbaum | 705/18 |
| 2001/0001856 A1 * | 5/2001 | Gould et al. | 705/39 |
| 2009/0099965 A1 * | 4/2009 | Grant, IV | 705/41 |

OTHER PUBLICATIONS

PR_Newswire; "Introducing a Prepaid Card Designed for People in Debt"; Sep. 26, 2005.*
Lewis, Peter H. "Program Upgrades Help with Personal Finances"; Journal Record; Jan. 7, 1993.*
U.S. Appl. No. 13/157,125 entitled "Prepaid Card Rewards" filed Jun. 9, 2011.

* cited by examiner

*Primary Examiner* — Edward Chang
(74) *Attorney, Agent, or Firm* — Michael A. Springs; Moore & Van Allen PLLC; Esther F. Queen

(57) ABSTRACT

In general terms, embodiments of the present invention relate to methods and apparatuses for providing one or more prepaid cards, prepaid card accounts, and/or prepaid card account services. For example, in some embodiments, a method is provided that includes: (a) receiving transaction information associated with a transaction, where the transaction includes a transaction machine, a prepaid card account, and a holder of the prepaid card account; (b) determining, based at least partially on the transaction information, that the transaction involves the prepaid card account; (c) determining that the prepaid card account has a budget category; (d) determining, based at least partially on the transaction information, that the transaction applies to the budget category; (e) determining that the budget category has a spending threshold; (f) determining, based at least partially on the transaction information, that the spending threshold will be (or has been) met as a result of the transaction; and (g) sending an alert to the holder based at least partially on the determining that the spending threshold will be (or has been) met.

29 Claims, 6 Drawing Sheets

PREPAID CARD BUDGETING

CROSS-REFERENCE TO RELATED APPLICATIONS

The present application claims priority to U.S. Provisional Patent Application No. 61/454,386, which was filed on Mar. 18, 2011, is entitled "Prepaid Card Budgeting," and is incorporated by reference herein in its entirety.

BACKGROUND

Financial institution customers are constantly looking for new and useful ways to better manage their finances. This is particularly so given that most of today's financial institution customers have multiple financial accounts and the consequences associated with mismanaging or forgetting about any one of them can lead to unexpected and/or unwanted outcomes. For example, a customer may overdraft his checking account and incur a related overdraft fee by engaging in a transaction that he mistakenly believes his account can cover. Accordingly, there is a need to provide methods and apparatuses that help financial institution customers manage their finances in ways that avoid or reduce unexpected or unwanted outcomes.

SUMMARY OF SELECTED EMBODIMENTS OF THE PRESENT INVENTION

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

In general terms, embodiments of the present invention relate to methods and apparatuses for providing one or more prepaid cards, prepaid card accounts, and/or prepaid card account services. For example, in some embodiments, a financial institution customer is provided with a prepaid card and prepaid card account. The customer may load and/or reload funds onto the prepaid card account, and then use the account to engage in one or more transactions. In addition, in some embodiments, the customer may set, define, choose, input, assign, and/or otherwise select (sometimes collectively referred to herein as "select" for simplicity) one or more budget categories for the prepaid card account, such as, for example, food (e.g., restaurants, groceries, etc.), entertainment, clothing, travel, medical/health care, housing, utilities, charities/donations, transportation (e.g., gas, service, etc.), online purchases, ATM withdrawals, retail purchases, and/or the like.

In some embodiments, the customer may select a spending limit for each budget category. In accordance with some embodiments, the spending limit refers to the total amount the customer may spend in a particular budget category before being declined. For example, in some embodiments, a customer's prepaid card account may have a transportation budget category and a spending limit of $125 for that category. In such embodiments, if the customer attempts to engage in a transportation transaction (e.g., purchase gas, oil change, etc.) that would result in that $125 spending limit being exceeded, then the transaction will be declined. In some embodiments, the spending limit for a particular budget category is reached when the balance for that particular budget category is $0.

In some embodiments, the customer will receive an alert (e.g., at the customer's mobile phone) before the transaction is actually declined but after it is determined that the transaction will be declined, where the alert: (a) indicates that the transaction will be declined; (b) indicates why the transaction will be declined; (c) identifies the details of the transaction; (d) identifies the current transportation budget category balance and/or spending limit, and/or the like. Additionally or alternatively, in other embodiments, the customer will receive an alert after and/or as a result of the transaction being declined, where the alert: (a) indicates that the transaction was declined; (b) indicates why the transaction was declined; (c) identifies the details of the transaction; (d) identifies the current transportation budget category balance and/or spending limit, and/or the like.

Additionally or alternatively, in some embodiments, the customer may select a spending threshold for each budget category. In accordance with some embodiments, the spending threshold refers to a predetermined partial amount that the customer may spend in the budget category before an alert is sent to the customer. It will be understood that the spending threshold for a budget category is typically less than the spending limit for that budget category. For example, in some embodiments, a customer's prepaid card account may have a clothing budget category, a spending limit of $75 for that category, and a spending threshold of $50 for that category. Accordingly, in such embodiments, if the customer engages in a clothing transaction (e.g., purchases clothes, dry cleaning, etc.) that results in the clothing budget category balance being reduced to $20 (meaning that $55 of the spending limit has been spent, which is greater than the $50 spending threshold), then the customer will receive an alert (e.g., at the customer's mobile phone), where the alert: (a) indicates that the customer has exceeded the clothing budget category spending threshold; (b) identifies the current clothing budget category balance; (c) identifies the spending threshold; (d) identifies the spending limit, and/or the like.

Of course, it will be understood that there may be different spending limits and/or different spending thresholds for different budget categories. For example, in some embodiments, the customer may select a restaurant budget category and an online purchases budget category, may select a $200 spending limit for the restaurant budget category and a $100 spending limit for the online purchases budget category, and/or may select a $150 spending threshold for the restaurant budget category and an $80 spending threshold for the online purchases budget category. Also, a transaction that involves the prepaid card account may, in some embodiments, only apply to one related budget category. For example, in some embodiments, a customer may use his prepaid card account to engage in a transaction associated with the merchant category code "ZZZZ" for airlines (e.g., by purchasing airline tickets). In such embodiments, that transaction may apply only to a travel budget category associated with the prepaid card account and not, for example, to a restaurant budget category associated with the prepaid card account.

Thus, it will be understood that some embodiments of the present invention may enable a holder of a prepaid card account to better manage their finances through the use of budget categories, spending limits, and spending thresholds associated with the prepaid card account. For example, in some embodiments, the holder may direct deposit a monthly paycheck into his prepaid card account and then use the categories, limits, and thresholds associated with the prepaid card account to budget those funds for the upcoming month. In some embodiments, when funds are loaded and/or reloaded onto the prepaid card account, the funds are automatically allocated across the budget categories in accordance with (e.g., proportional to) the spending limits for those budget categories. For example, in some embodiments, a prepaid card account includes a transportation budget category having a $100 spending limit, a restaurant budget category having a $200 spending limit, and a clothing budget category having a $150 spending limit. In such embodiments, if $450 is loaded onto the prepaid card account, the funds are automatically divided across the budget categories proportional to the spending limits, such that $100 is assigned to the transportation budget category (i.e., the balance for the transaction budget category is increased by $100), $200 is assigned to the restaurant budget category, and $150 is assigned to the clothing category. Of course, in other embodiments, instead of the funds being automatically assigned to different budget categories, the holder may allocate the funds across the budget categories himself.

Also, it will be understood that, in some embodiments, the balance for a particular budget category may exceed the spending limit for that particular budget category. For example, in some embodiments, where the prepaid card account has a food budget category, where that food budget category has a spending limit of $100, and where the balance for that food budget category is $75, the holder of the prepaid card account may reload the food budget category with $50 in funds so that the food budget category would have a $125 balance, which is greater than the $100 spending limit. However, in other embodiments, the balance for a particular budget category may never exceed the spending limit for that budget category. For example, in some embodiments, where the balance for a particular budget category is $50 and the spending limit for that budget category is $50, the holder of the prepaid card account cannot reload that particular budget category with any funds until the balance for that budget category is reduced.

In more general terms, some embodiments of the present invention provide a method that includes: (a) receiving transaction information associated with a transaction; (b) determining, based at least partially on the transaction information, that the transaction involves a prepaid card account; (c) determining that the prepaid card account has a budget category; (d) determining, based at least partially on the transaction information, that the transaction applies to the budget category; (e) determining that the budget category has a spending threshold; (f) determining, based at least partially on the transaction information, that the spending threshold will be (or has been) met as a result of the transaction; and (g) sending an alert to a holder of the prepaid card account based at least partially on the determining that the threshold will be (or has been) met.

In other embodiments, a method is provided that includes: (a) receiving transaction information associated with a transaction; (b) determining, based at least partially on the transaction information, that the transaction involves a prepaid card account; (c) determining that the prepaid card account has a budget category; (d) determining, based at least partially on the transaction information, that the transaction applies to the budget category; (e) determining that the budget category has a spending limit; (f) determining, based at least partially on the transaction information, that the spending limit will be exceeded as a result of the transaction; and (g) declining the second transaction. In some of these embodiments, the method additionally or alternatively includes sending an alert to a holder of the prepaid card account based at least partially on the declining the second transaction and/or determining that the spending limit will be exceeded.

In still other embodiments, a method is provided that includes: (a) presenting a user interface to a holder of a prepaid card account, where the user interface enables and/or prompts the holder to select one or more budget categories for the prepaid card account and one or more spending limits for the one or more budget categories; (b) receiving, from the holder and via the user interface, information indicating that the holder has selected a budget category for the prepaid card account and a spending limit for the budget category; and (c) storing information associated with the prepaid card account, the budget category, and the spending limit in an account profile associated with the prepaid card account.

BRIEF DESCRIPTION OF THE DRAWINGS

Figure 1:
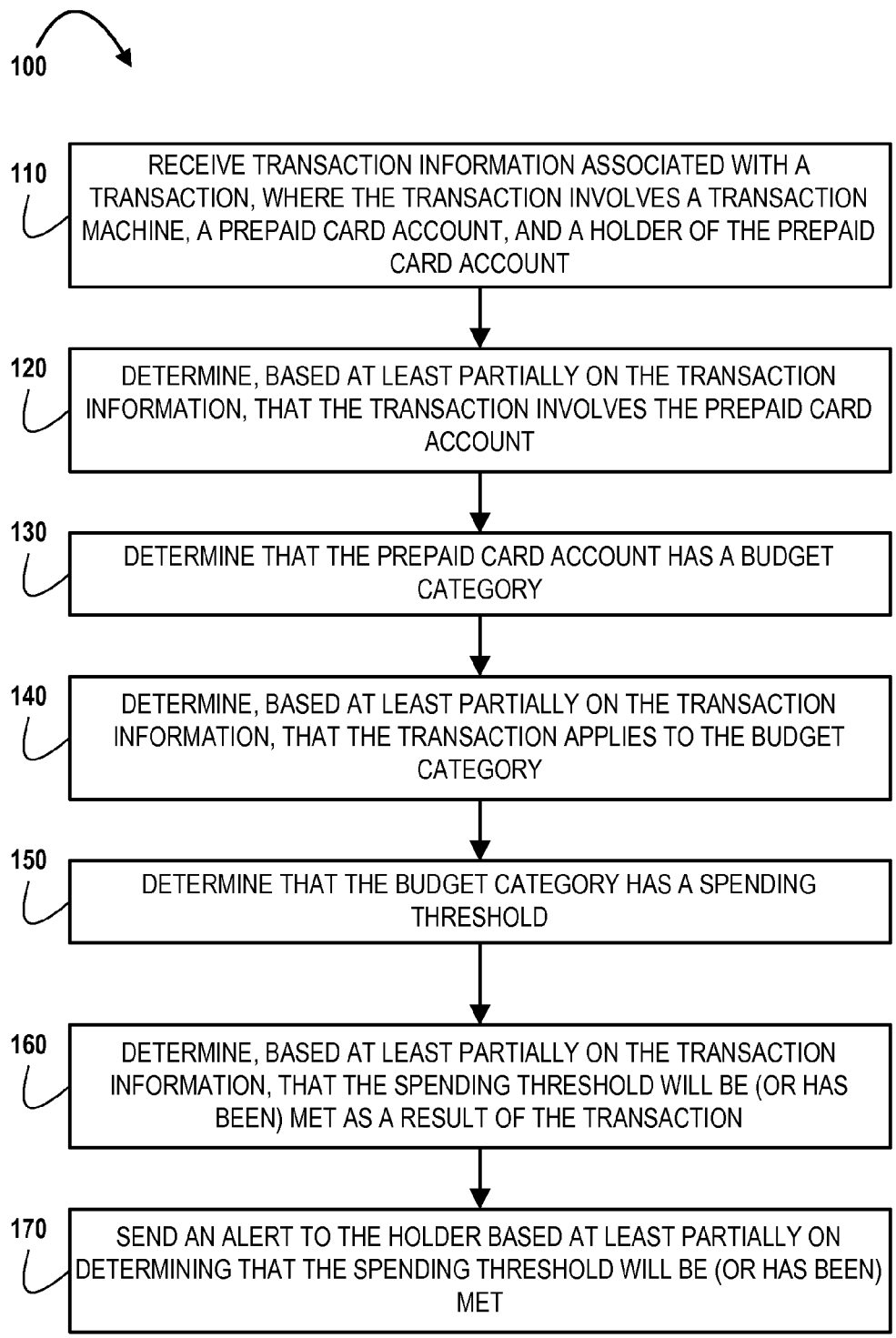
Figure 2:
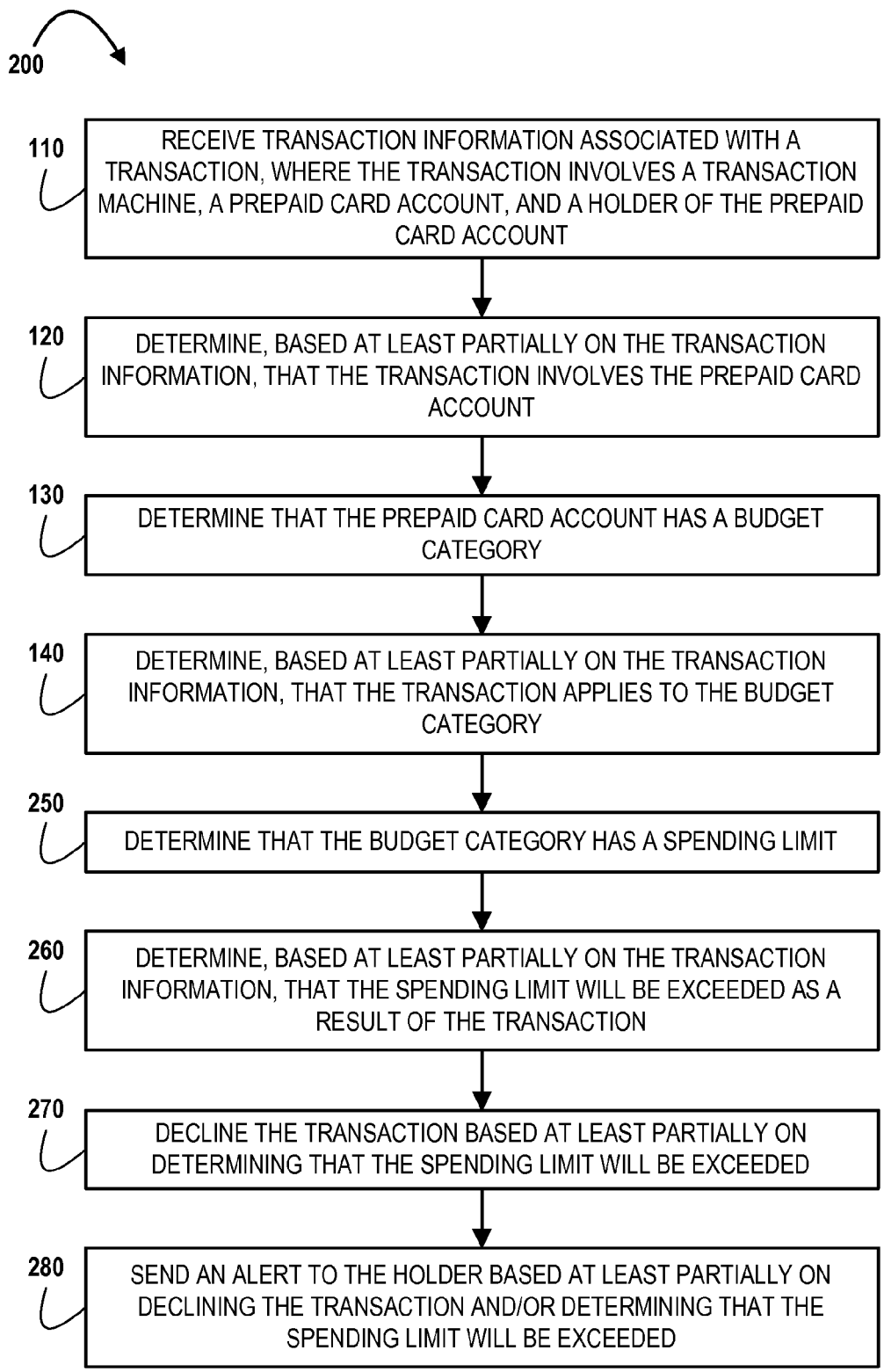
Figure 3:
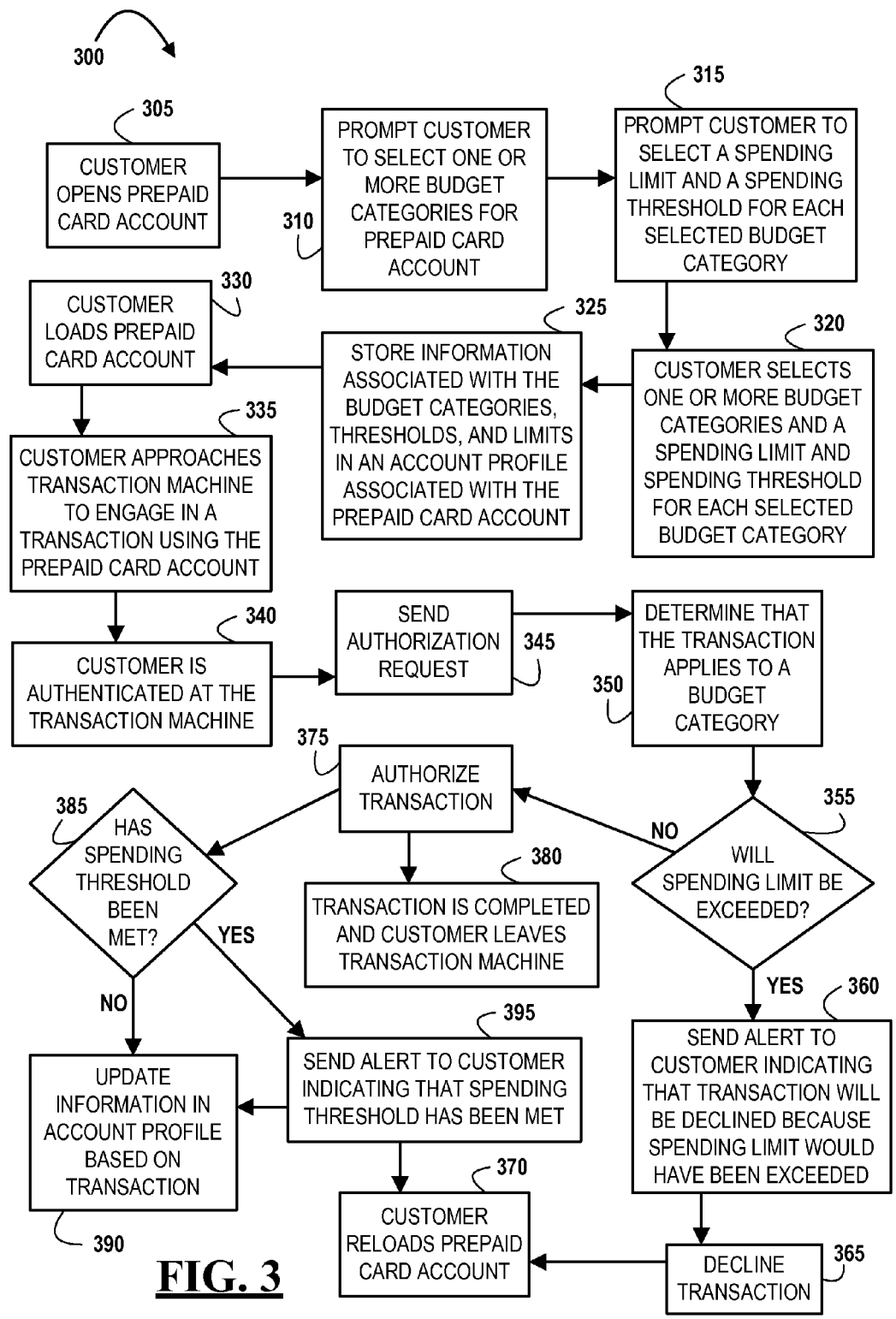
Figure 4:
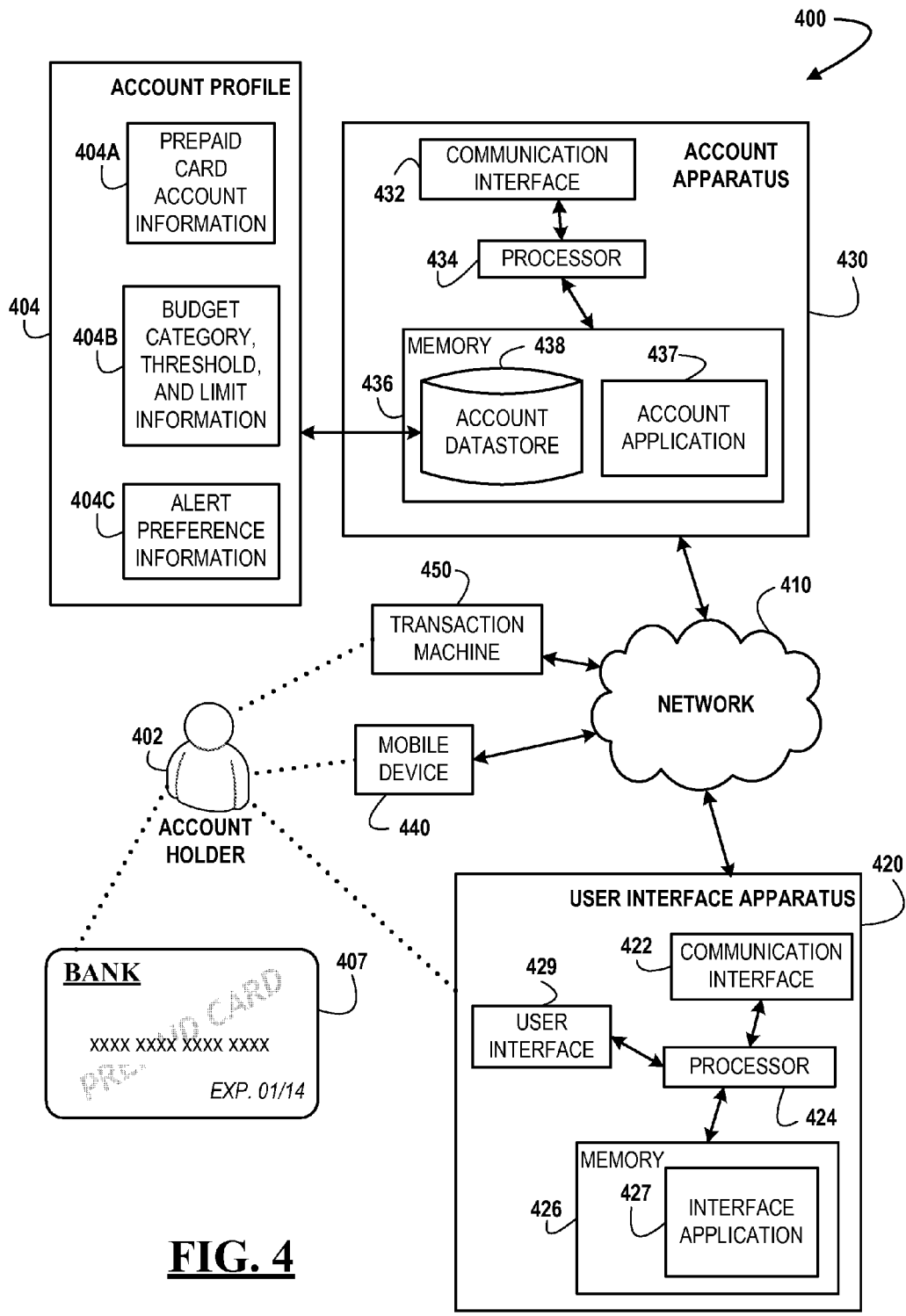
Figure 4A:
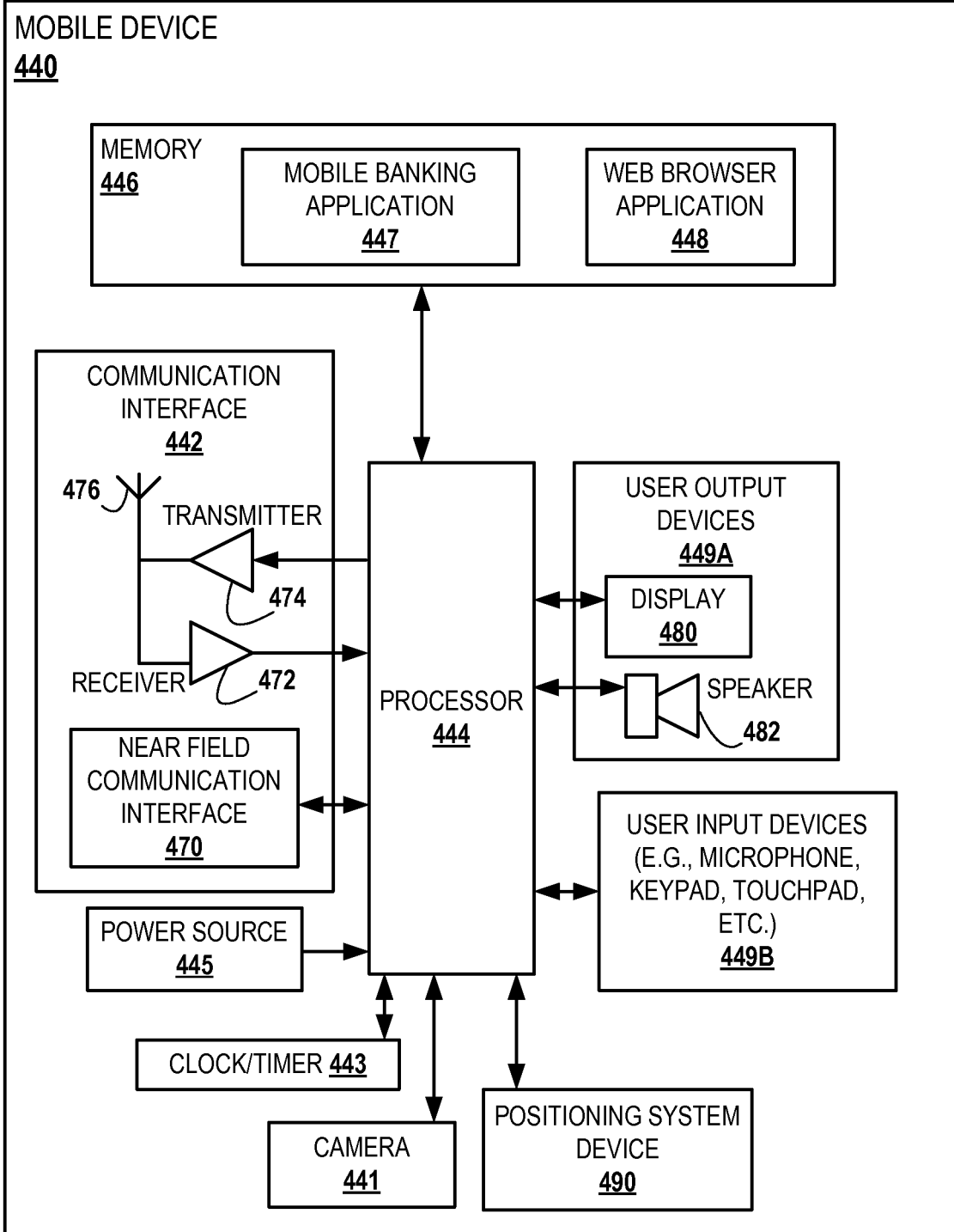
Figure 5:
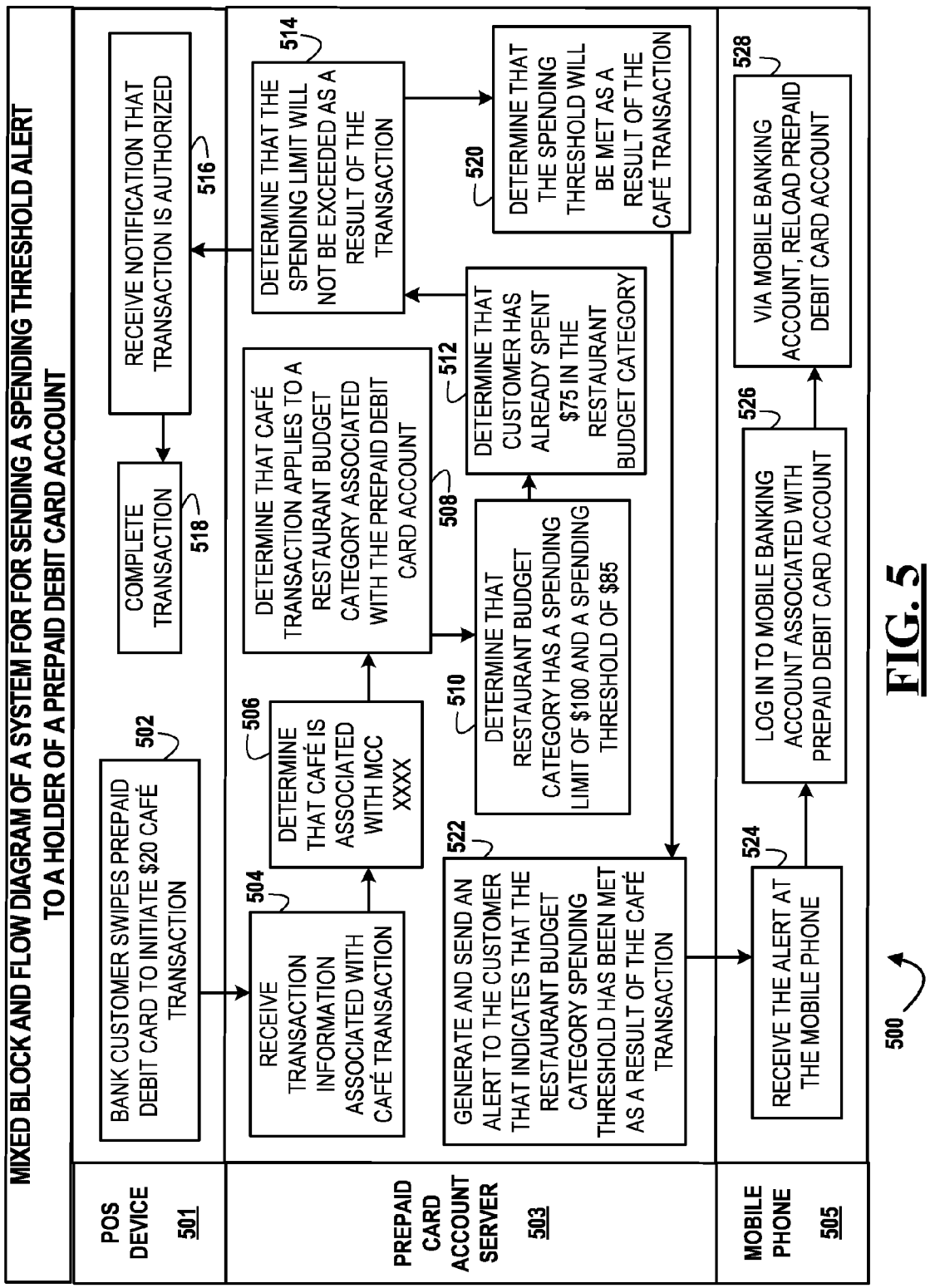

Having thus described some embodiments of the present invention in general terms, reference will now be made to the accompanying drawings, wherein:

FIG. 1 is a flow diagram illustrating a general process flow for providing a prepaid card account service, in accordance with an embodiment of the present invention;

FIG. 2 is a flow diagram illustrating a general process flow for providing a second prepaid card account service, in accordance with an embodiment of the present invention;

FIG. 3 is a flow diagram illustrating a more-detailed process flow for providing one or more prepaid card account services, in accordance with an embodiment of the present invention;

FIG. 4 is a block diagram illustrating technical components of a system for providing one or more prepaid cards, prepaid card accounts, and/or prepaid card account services, in accordance with an embodiment of the present invention;

FIG. 4A is a block diagram illustrating technical components of a mobile device for providing and/or participating in one or more prepaid card account services, in accordance with an embodiment of the present invention; and FIG. 5 is a mixed block and flow diagram of a system for sending a spending threshold alert to a holder of a prepaid debit card account, in accordance with an embodiment of the present invention.

DETAILED DESCRIPTION OF EMBODIMENTS OF THE PRESENT INVENTION

Referring to FIG. 1, a general process flow 100 is illustrated for providing one or more prepaid card account services, in accordance with an embodiment of the present invention. In some embodiments, the process flow 100 is performed by an apparatus (i.e., one or more apparatuses) having hardware and/or software configured to perform one or more portions of the process flow 100. In such embodiments, as represented by block 110, the apparatus is configured to receive transaction information associated with a transaction, where the transaction involves a transaction machine, a prepaid card account, and a holder of the prepaid card account. As represented by block 120, the apparatus is also configured to determine, based at least partially on the transaction information, that the transaction involves the prepaid card account. In addition, as represented by block 130, the apparatus is configured to determine that the prepaid card account has a budget category. As represented by block 140, the apparatus is further configured to determine, based at least partially on the transaction information, that the transaction applies to the budget category. Additionally, as represented by block 150, the apparatus is configured to determine that the budget category has a spending threshold. As represented by block 160, the apparatus is further configured to determine, based at least partially on the transaction information, that the spending threshold will be (or has been) met as a result of the transaction. Further, as represented by block 170, the apparatus is configured to send an alert to the holder based at least partially on determining that the spending threshold will be (or has been) met.

For simplicity, it will be understood that the portion represented by block 140 is sometimes referred to herein as the "budget category determination," and the portion represented by block 160 is sometimes referred to herein as the "threshold determination." In addition, it will be understood that the term "determine," as used herein, is meant to have its one or more ordinary meanings (i.e., its ordinary dictionary definition(s)), but that in other embodiments, the term "determine" is meant to have one or more ordinary meanings of one or more of the following terms: decide, conclude, verify, ascertain, find, discover, learn, calculate, observe, read, and/or the like. In addition, in some embodiments, the phrase "based at least partially on" is meant to have one or more of its ordinary meanings, but in other embodiments, the phrase "based at least partially on" is meant to have one or more ordinary meanings of one or more of the following terms and/or phrases: in response to, because of, after, as a result of, and/or the like. Further, for simplicity, the phrase "prepaid card account" is meant to include the prepaid card account and/or the prepaid card associated with that prepaid card account, unless explicitly stated otherwise.

It will be understood that the apparatus having the process flow 100 can include one or more separate and/or different apparatuses. For example, in some embodiments, one apparatus (e.g., the transaction machine 450 described in connection with FIG. 4, etc.) is configured to perform the portions of the process flow 100 represented by blocks 110-160, and a second apparatus (e.g., the account apparatus 430) is configured to perform the portion represented by block 170. As still another example, in some embodiments, a single apparatus (e.g., the account apparatus 430) is configured to perform each and every portion of the process flow 100.

Regarding block 110, the phrase "transaction machine," as used herein, generally refers to an interactive computer terminal that is configured to initiate, perform, complete, and/or facilitate one or more financial transactions. Examples of transaction machines include, but are not limited to, automated teller machines (ATMs), POS devices (e.g., merchant terminals, etc.), self-service machines (e.g., vending machine, self-checkout machine, parking meter, etc.), kiosks (e.g., an Internet kiosk, ticketing kiosk, bill pay kiosk, etc.), mobile phones (e.g., feature phone, smart phone, iPhone®, etc.), gaming devices, computers (e.g., personal computers, tablet computers, laptop computers, etc.), personal digital assistants (PDAs), and/or the like.

In some embodiments, the transaction machine referred to in block 110 is located in a public place and is available for public use (e.g., on a street corner, on the exterior wall of a banking center, at a public rest stop, etc.). In other embodiments, the transaction machine is additionally or alternatively located in a place of business and available for public and/or business customer use (e.g., in a retail store, post office, banking center, grocery store, etc.). In accordance with some embodiments, the transaction machine is not owned by the user of the transaction machine and/or by the holder of the prepaid card account referred to in block 110. However, in other embodiments, the transaction machine is located in a private place, is available for private use, and/or is owned by the user of the transaction machine (e.g., the holder referred to in block 110).

Further regarding block 110, the transaction involving the holder and the transaction machine can include any number and/or type of transaction(s) involving a transaction machine. For example, in some embodiments, the transaction includes one or more of the following: purchasing, renting, selling, and/or leasing goods and/or services (e.g., groceries, stamps, tickets, DVDs, vending machine items, etc.); withdrawing cash (where possible); making payments to creditors (e.g., paying monthly bills; paying federal, state, and/or local taxes and/or bills; etc.); sending remittances; transferring balances from one account to another account; donating to charities; and/or the like.

Still referring to block 110, the prepaid card account generally refers to a deposit account that is associated with a prepaid card, can be loaded and/or reloaded with funds, and cannot be overdrawn. In some embodiments, the prepaid card account may be used to engage in one or more transactions but only if those one or more transactions are "paid for" in advance. Additionally or alternatively, in some embodiments, the prepaid card account is not a conventional checking account, savings account, credit card account, or the like. Further, in some embodiments, the prepaid card account is not linked or otherwise tied to a deposit account, credit account, master account, sub-account, or the like for purposes of covering overdrafts and/or over limit amounts. This is not to say, however, that the prepaid card account cannot be loaded and/or reloaded with funds from one or more deposit and/or credit accounts. For example, in some embodiments, the holder of the prepaid card account may use the holder's checking account to load the prepaid card account with funds; however, if the prepaid card account attempts to engage in an overdraft transaction, the checking account cannot be used to cover the overdraft amount. In addition, in such embodiments, the overdraft transaction will be declined because the account involved in the transaction is a prepaid card account.

Further regarding block 110, in some embodiments, the prepaid card is not a gift card or stored-value card (SVC), and the prepaid card account is not a gift card account or SVC account. For example, as understood herein, an SVC refers to a card that is configured such that balance information associated with the SVC can be written and/or rewritten to the SVC (e.g., to a magnetic stripe disposed on the SVC) after one or more transactions. For example, if a $50 SVC is used to purchase a $30 product, a POS device that processes the SVC transaction may write information to the SVC indicating that the SVC has a $20 balance remaining as a result of the $30 transaction. In contrast, in some embodiments, the prepaid card only stores account information (e.g., routing and/or account numbers, PINS, identity of holder, identity of financial institution that maintains the prepaid card, etc.) on the card (e.g., in a magnetic stripe and/or some other computer-readable medium disposed on the card), and balance information (e.g., balance amount, transaction history, etc.) and/or other information associated with the prepaid card account (e.g., total balance amount, budget categories, budget category balance amounts, spending limits, spending thresholds, transaction history, etc.) is not stored on the card. Instead, in such embodiments, the balance information is stored on a back-end datastore at the financial institution that issued the prepaid card and/or that maintains the prepaid card account. For example, in some embodiments, the balance information associated with the prepaid card account (e.g., the current balance amount for each budget category) is stored in an account profile associated with the prepaid card account and/or in an electronic banking account (e.g., online banking account, mobile banking account, text banking account, etc.) associated with the prepaid card account. Further, in some embodiments, the prepaid card is different from a gift card or SVC because the prepaid card (and/or associated prepaid card account) is issued in the name of an individual account holder (e.g., the holder referred to in block 110), whereas the gift card and SVC are not (e.g., the holder of the gift card or SVC is anonymous). That said, in some embodiments, the prepaid card may be embodied as a gift card, and the prepaid card account may be embodied as a gift card account. Additionally or alternatively, in some embodiments, the prepaid card may be embodied as an SVC, and the prepaid card account may be embodied as an SVC account.

Also, it will be understood that the prepaid card account can be loaded and/or reloaded with funds through one or more channels. Exemplary channels include ATMs, kiosks (e.g., retail store kiosks, ticketing kiosks, etc.), electronic banking accounts, personal computers, mobile phones, direct deposit, mobile/remote deposit, banking centers, call centers, and/or the like. Additionally or alternatively, in some embodiments, the prepaid card account is configured such that funds can be moved off of the prepaid card account after the prepaid card account is loaded and/or reloaded with those funds. For example, in some embodiments, the holder of the prepaid card account may load the prepaid card account with $50 from his checking account on Monday, but then a day later, the holder may transfer $25 from his prepaid card account back to his checking account.

Also, in some embodiments, the prepaid card associated with the prepaid card account may be purchased at a retailer, even though the prepaid card account itself is maintained by a financial institution. In some of these embodiments, the prepaid card account is preloaded with funds. For example, in some embodiments, a financial institution customer may purchase a $50 prepaid debit card at a retailer for $50 plus a small service charge (e.g., $4.95). In some of these embodiments, although the prepaid debit card was purchased at the retailer, the prepaid debit card account must be activated and/or registered at the financial institution that maintains the prepaid debit card account. In some of these embodiments, the prepaid debit card account must be activated and/or registered with the financial institution before the prepaid debit card account can be used to engage in transactions. In other embodiments, however, the financial institution that maintains the prepaid card account may provide and/or issue the prepaid card directly to the holder (e.g., via mail, at a banking center, etc.). Also, in some embodiments, a personal identification number (PIN) (e.g., three or four-digit secret number) may be associated with the prepaid card account, and in some embodiments, the prepaid card account cannot engage in transactions unless and/or until the correct PIN is provided to the transaction machine and/or the apparatus having the process flow 100.

The transaction information referred to in block 110 can be any information that identifies, defines, describes, and/or is otherwise associated with the transaction. Exemplary transaction information includes, but is not limited to, the party(ies) involved in the transaction, the date and/or time of the transaction, the posting date of the transaction, the account(s) involved in the transaction, the transaction amount(s) associated with the transaction, the good(s) and/or service(s) involved in the transaction (e.g., product names, stock keeping unit (SKU) information, universal product code (UPC) information, etc.), a description of the transaction (which, itself, can include any transaction information, e.g., the description may describe the transaction status, the goods and/or services involved in the transaction, etc.), and/or the like.

The transaction information can also include any information that defines and/or identifies the type of the transaction. As understood herein, the transaction type of a transaction may be defined, at least in part, by the one or more goods and/or services involved in the transaction, the one or more types of accounts involved in the transaction (e.g., prepaid card account, etc.), the one or more parties involved in the transaction (e.g., account holder, bank, teller, merchant, counterparty, etc.), when the transaction was initiated (e.g., time of day, day of week, etc.), and/or the like. In some embodiments, the transaction type is defined, at least in part, by the one or more channels through which the transaction is conducted, such as, for example, a POS device (e.g., merchant terminal, etc.), ATM, teller terminal, electronic banking account (e.g., online banking account, mobile banking account, SMS banking account, etc.), personal computer, kiosk, call center, and/or the like. Additionally or alternatively, in some embodiments, the transaction type is defined, at least in part, by the one or more instruments and/or methods used to conduct the transaction, such as, for example, prepaid cards, wire transfers, online bill pay, automated clearing house (ACH), contactless payments, near field communication (NFC) interface payments, and/or the like.

In some embodiments, the transaction information additionally or alternatively identifies and/or describes one or more merchant category codes (MCCs) associated with the transaction. As used herein, the phrase "merchant category code" generally refers to a number assigned to a merchant by a financial institution, where the number is used to classify the merchant by the type of goods and/or services the merchant provides. In some embodiments, the merchant category code is a four digit number assigned by a credit card provider (which, in some embodiments, is a bank). Exemplary merchant category codes include "AAAA" for fast food restaurants, "BBBB" for pawn shops, "CCCC" for hospitals, "XXXX" for grocery supermarkets, and "YYYY" for a specific hotel. A merchant category code may generally refer to the goods and/or services provided by a merchant (e.g., hospital, fast food restaurant, etc.) and/or may specifically identify the name of an individual merchant. In other words, individual industries and/or individual merchants can have their own merchant category codes. In some embodiments, a transaction type may be defined, at least in part, by one or more merchant category codes associated with the transaction.

It will be understood that any given transaction may have more than one transaction type. For example, in accordance with some embodiments, a transaction involving a transfer of funds from a checking account to a prepaid card account, where the transaction is initiated via online banking, may be defined as a funds transfer transaction, an checking account transaction, a prepaid card account transaction, and/or an online banking transaction. As still another example, in accordance with some embodiments, a purchase transaction involving a POS device maintained by a grocery store and a prepaid card may be defined as a purchase transaction, a POS device transaction, a grocery store transaction, a prepaid card transaction, and/or a "MCC XXXX" transaction.

Also regarding block 110, the apparatus having the process flow 100 can be configured to receive the transaction information in any way. For example, in some embodiments, the apparatus is configured to receive an authorization request associated with the transaction, where the authorization request includes the transaction information. In some embodiments, the apparatus is embodied as an authorization apparatus maintained by a financial institution, where the apparatus is configured to consider, approve, and/or decline authorization requests for debit transactions, credit transactions, prepaid card transactions, ATM transactions, POS device transactions, and/or one or more other types of transactions that involve one or more accounts maintained by the financial institution.

In some embodiments, the apparatus having the process flow 100 is configured to receive the transaction information based at least partially on the holder presenting account information (e.g., prepaid card account number, prepaid card number, credentials, PIN, expiration date of prepaid card, card verification value (CVV) on the prepaid card, name(s) of holder(s) of the prepaid card account, etc.) at the transaction machine. For example, in some embodiments, where the transaction machine is embodied as a POS device, the holder presents account information at the POS device by swiping a prepaid card through a POS device. As another example, in some embodiments, the holder presents account information at the transaction machine by inputting account information into the transaction machine via a user interface associated with the transaction machine. As still another example, in some embodiments, the holder presents account information at the transaction machine by "tapping" a NFC-enabled prepaid card at an NFC-enabled transaction machine. For example, in some of these embodiments, the prepaid card includes a near field communication (NFC) interface (e.g., RFID tag, Bluetooth®, smart card, IR/radio transmitter/receiver, etc.), and the transaction machine includes an NFC interface, such that the holder may wirelessly and/or contactlessly communicate account information from the prepaid card to the transaction machine by holding the NFC interface of the prepaid card within approximately four inches of the NFC interface of the transaction machine.

Additionally or alternatively, the apparatus can be configured to receive the transaction information directly or indirectly from the source of the transaction. For example, in some embodiments, the apparatus is located remotely from the transaction machine but is operatively connected to the transaction machine via a network. As another example, the apparatus may include, be included in, and/or be embodied as a transaction machine. For example, in some embodiments, the apparatus having the process flow 100 includes the transaction machine referred to in block 110. As another example, in some embodiments, the apparatus having the process flow 100 is embodied as a transaction machine separate from, and/or different than, the transaction machine mentioned in the process flow 100.

Further regarding block 110, in some embodiments, the apparatus having the process flow 100 is controlled, serviced, owned, operated, managed, and/or otherwise maintained (sometimes collectively referred to herein as "maintained" for simplicity) by a financial institution (e.g., bank, credit card provider, mortgage lender, student loan company, etc.). In some embodiments, the financial institution that maintains the apparatus having the process flow 100 is the same financial institution that maintains the prepaid card account referred to in block 110.

Regarding block 120, the apparatus can be configured to determine that the transaction involves the prepaid card account in any way. In some embodiments, this determination is based at least partially on the transaction information received. For example, in some embodiments, the transaction information includes an account number associated with the prepaid card and/or the prepaid card account, such that the apparatus having the process flow 100 can use that account number to identify the account and determine the type of account (i.e., that the account is a prepaid card account). In some embodiments, the identity and/or type of the account may be apparent based on the specific account number associated with the account (e.g., where the middle four digits of an account number is a predetermined number if the account is a prepaid card account).

Regarding block 130, in some embodiments, the holder may select one or more budget categories for the prepaid card account, but in other embodiments, the one or more budget categories may be selected (or pre-selected) for the holder by, for example, the financial institution that maintains the prepaid card account. It will be understood that a budget category may relate to, and/or be defined by, a merchant, merchant category code, type of product, type of channel, and/or type of transaction. Exemplary budget categories include, but are not limited to, food (e.g., restaurants, groceries, etc.), entertainment, clothing, travel, medical/health care, housing, utilities, charities/donations, transportation (e.g., gas, service, etc.), online purchases, ATM withdrawals, retail purchases, and/or the like.

Regarding block 140, the apparatus can be configured to make the budget category determination in any way. For example, in some embodiments, the apparatus is configured to determine that the transaction applies to the budget category based at least partially on the transaction information. As a specific example, in some embodiments, the budget category is associated with list of predetermined merchants and/or predetermined merchant category codes, such that the apparatus is configured to determine that a transaction applies to the budget category if the transaction involves any of the merchants and/or merchant category codes on the list. As another example, in some embodiments, the budget category is associated with a predetermined type of transaction (e.g., withdrawal, purchase, transfer) and/or channel (e.g., ATM, online banking, etc.), such that the apparatus is configured to determine that a transaction applies to the budget category if the transaction has the predetermined transaction type and/or is performed via the predetermined type of channel. In some of these embodiments, the transaction information identifies the transaction type and/or channel type of the transaction.

Regarding blocks 150 and 160, in some embodiments, the budget category may have a spending limit and/or spending threshold. As with the budget category, the holder may select the limit and/or threshold, or these may be selected (or pre-selected) for the holder. In accordance with some embodiments, the spending limit generally refers to the total amount the holder may spend in the budget category before being declined. For example, in some embodiments, a holder's prepaid card account may have a transportation budget category and a spending limit of $125 for that category. In such embodiments, if the holder attempts to engage in a transportation transaction (e.g., purchase gas, oil change, etc.) that would result in that $125 spending limit being exceeded, then the transaction will be declined (e.g., by the apparatus having the process flow 100). In some embodiments, the spending limit for a particular budget category is reached when the balance for that particular budget category is $0.

In accordance with some embodiments, the spending threshold generally refers to a predetermined partial amount that the holder may spend in the budget category before an alert is sent to the holder. It will be understood that the spending threshold for the budget category is typically less than the spending limit for the budget category (i.e., if the budget category has a spending limit). For example, in some embodiments, a holder's prepaid card account may have a clothing budget category, a spending limit of $75 for that category, and a spending threshold of $50 for that category. Accordingly, in such embodiments, if the holder engages in a clothing transaction (e.g., purchases clothes, dry cleaning, etc.) that results in the clothing budget category balance being reduced to $20 (meaning that $55 of the spending limit has been spent), then the apparatus will determine that the spending threshold for that clothing budget category has been met and an alert will be sent to the holder. In some embodiments, the spending threshold for the budget category is tied to the spending limit for that budget category. For example, in some embodiments, the spending threshold is 85% of the spending limit. As another example, in some embodiments, the spending threshold is $15 away from the spending limit.

Of course, it will be understood that there may be different spending limits and/or different spending thresholds for different budget categories. For example, in some embodiments, the holder may select a restaurant budget category and an online purchases budget category, may select a $200 spending limit for the restaurant budget category and a $100 spending limit for the online purchases budget category, and/or may select a $150 spending threshold for the restaurant budget category and a $80 spending threshold for the online purchases budget category. Also, a transaction that involves the prepaid card account may, in some embodiments, only apply to one related budget category. For example, in some embodiments, a holder may use his prepaid card account to engage in a transaction associated with the merchant category code "ZZZZ" for airlines (e.g., by purchasing airline tickets). In such embodiments, that transaction may apply only to a travel budget category associated with the prepaid card account and not, for example, to a restaurant budget category associated with the prepaid card account.

Thus, it will be understood that some embodiments of the present invention may enable a holder of a prepaid card account to better manage their finances through the use of budget categories, spending limits, and spending thresholds associated with the prepaid card account. For example, in some embodiments, the holder may direct deposit a monthly paycheck into his prepaid card account and then use the categories, limits, and thresholds associated with the prepaid card account to budget those funds for the upcoming month. In some embodiments, when funds are loaded and/or reloaded onto the prepaid card account, the funds are automatically allocated across the budget categories in accordance with (e.g., proportional to) the spending limits for those budget categories. For example, in some embodiments, a prepaid card account includes a transportation budget category having a $100 spending limit, a restaurant budget category having a $200 spending limit, and a clothing budget category having a $150 spending limit. In such embodiments, if $450 is loaded onto the prepaid card account, the funds are automatically divided across the budget categories proportional to the spending limits, such that $100 is assigned to the transportation budget category (i.e., the balance for the transaction budget category is increased by $100), $200 is assigned to the restaurant budget category, and $150 is assigned to the clothing category. Of course, in other embodiments, instead of the funds being automatically assigned to different budget categories, the holder may allocate the funds across the budget categories himself.

Also, it will be understood that, in some embodiments, the balance for a particular budget category may exceed the spending limit for that particular budget category. For example, in some embodiments, where the prepaid card account has a food budget category, where that food budget category has a spending limit of $100, and where the balance for that food budget category is $75, the holder of the prepaid card account may reload the food budget category with $50 in funds so that the food budget category would have a $125 balance, which is greater than the $100 spending limit. However, in other embodiments, the balance for a particular budget category may never exceed the spending limit for that budget category. For example, in some embodiments, where the balance for a particular budget category is $50 and the spending limit for that budget category is $50, the holder of the prepaid card account cannot reload that particular budget category with any funds until the balance for that budget category is reduced.

Regarding blocks 160 and 170, the apparatus having the process flow 100 can be configured to make the threshold determination and/or send the alert to the holder either during the transaction or after the transaction occurs (or both). For example, in some embodiments, the apparatus is configured to make the threshold determination and/or send the alert to the holder: (a) moments after receiving the transaction information; (b) while processing the transaction; (c) before the apparatus authorizes the transaction; and/or (d) while the holder is still standing at the transaction machine. However, in other embodiments, the apparatus is configured to make the threshold determination and/or send the alert to the holder: (a) after authorizing the transaction; (b) after the transaction is completed at the transaction machine; and/or (c) after the customer leaves the transaction machine. In some embodiments, the apparatus may make the threshold determination and/or send the alert to the holder minutes, hours, or days (or even longer) after the transaction occurs.

Regarding block 170, the alert may be embodied as one or more notifications, messages, questions, instructions, graphics, sounds, phone calls, text messages (e.g., SMS messages, MMS messages, EMS messages, etc.), actionable alerts, instant messages, voice messages, voice recordings, interactive voice response (IVR) communications, pages, emails, communications specific to one or more social media networks and/or applications (e.g., Facebook®, Twitter®, MySpace®, etc.), and/or the like. For example, in some embodiments, after making the threshold determination, the apparatus having the process flow 100 generates and/or sends a text message to the mobile phone of the holder. As another example, in some embodiments, the apparatus instructs a human operator to call the holder. As still another example, in some embodiments, the apparatus posts a message to the holder's Facebook® wall.

It will be understood that the alert may include any amount and/or type of information. For example, in some embodiments, the apparatus generates and/or sends an alert to the holder, where the alert: (a) identifies the prepaid card account; (b) describes the transaction (e.g., type, amount, date/time, etc.); (c) identifies the affected budget category (and/or all of the budget categories associated with the prepaid card account); (d) identifies the spending limit and/or spending threshold for the affected budget category (and/or for all of the budget categories); (e) indicates that the transaction applies to the budget category (and/or why); (f) indicates that, as a result of the transaction, the spending threshold for the budget category has been met; (e) identifies the total balance for the prepaid card account before and/or after the transaction; (f) identifies the balance for the affected budget category before and/or after the transaction; and/or (g) prompts the holder to access a mobile banking account and/or to reload the prepaid card account with funds. For example, in some embodiments, where the prepaid card account has a grocery budget category and a $125 spending limit and $75 spending threshold for that grocery budget category, the alert is a text message, email, or notification that states "Regarding Your Prepaid Card Account, You Have Now Spent $75 of the $125 in Your Grocery Budget," "Your Grocery Budget Spending Limit is $125 and Your Grocery Budget Balance is Now $50," "You Have Now Met Your $75 Spending Threshold for Your Grocery Budget," and/or "You Are Now $50 Away From the Spending Limit of Your Grocery Budget." In some embodiments, the alert is embodied as a "push" communication delivered to a mobile device, personal computer, online banking account, etc. associated with and/or accessible to the holder.

It will be understood that the apparatus having the process flow 100 can be configured to perform any of the portions of the process flow 100 represented by blocks 110-170 upon or after one or more triggering events (which, in some embodiments, is one or more of the other portions of the process flow 100). As used herein, a "triggering event" refers to an event that automatically (i.e., without human intervention) triggers the execution, performance, and/or implementation of a triggered action, either immediately, nearly immediately, or sometime after (e.g., within minutes, etc.) the occurrence of the triggering event. For example, in some embodiments, the apparatus having the process flow 100 is configured such that the apparatus making the threshold determination (the triggering event) automatically and immediately or nearly immediately (e.g., within 1-30 seconds, etc.) triggers the apparatus to send the alert to the holder of the prepaid card account (the triggered action(s)). In some embodiments, the apparatus is additionally or alternatively configured to make the threshold determination (triggered action) automatically and immediately or nearly immediately after performing one or more of the portions represented by blocks 110-150 (triggering event(s)).

In accordance with some embodiments, the apparatus having the process flow 100 is configured to automatically perform one or more of the portions of the process flow 100 represented by blocks 110-170, whereas in other embodiments, one or more of the portions of the process flow 100 represented by blocks 110-170 require and/or involve human intervention (e.g., a user operating the apparatus configured to perform the process flow 100, etc.). In addition, it will be understood that, in some embodiments, the apparatus configured to perform the process flow 100 (and/or a user thereof) is configured to perform one or more portions (or combinations of portions) of the process flow 100, from start to finish, within moments, seconds, and/or minutes (e.g., within approximately 1-45 seconds from start to finish, etc.).

Also, it will be understood that the apparatus having the process flow 100 can be configured to perform one or more portions of any embodiment described and/or contemplated herein, such as, for example, one or more portions of the process flow 200 described herein, one or more portions of the process flow 300 described herein, and/or one or more portions of the process flow described in connection with FIG. 5. Also, the number, order, and/or content of the portions of the process flow 100 are exemplary and may vary. For example, in some alternative embodiments, the apparatus having the process flow 100 is also configured to authorize the transaction. As another example, in some alternative embodiments, apparatus is configured to update information (e.g., transaction history, budget category balances, etc.) stored in an account profile based at least partially on the transaction. Further, in some alternative embodiments, the apparatus is configured to enable the holder to open the prepaid card account, manage the prepaid card account, and/or to view information associated with the prepaid card account (e.g., transaction history, budget categories, budget category balances, spending limits, spending thresholds, etc.).

As still another example, in some alternative embodiments, the apparatus having the process flow 100 is configured to load and/or reload a prepaid card account. In still other alternative embodiments, the apparatus is configured to present a user interface (e.g., graphical user interface (GUI), text-based user interface, etc.) to the holder of the prepaid card account, where the user interface enables and/or prompts the holder to select one or more budget categories, spending limits, and/or spending thresholds for the prepaid card account. As another example, in some alternative embodiments, the apparatus having the process flow 100 is configured to identify and/or authenticate (e.g., confirm the identity of) the holder as a condition of processing the transaction, sending the alert to the holder, and/or the like. In some embodiments, the apparatus is configured to authenticate the holder based at least partially on a prepaid card, account number, username, password, PIN, biometric information, bar code, and/or other credential the holder inserts, provides, and/or presents to the apparatus having the process flow 100 (and/or to the transaction machine).

Referring now to FIG. 2, a general process flow 200 for providing a second prepaid card account service is provided, in accordance with an embodiment of the present invention. It will be understood that the process flow 200 illustrated in FIG. 2 represents an alternative embodiment of the process flow 100 described in connection with FIG. 1. In some embodiments, the process flow 200 is performed by an apparatus (i.e., one or more apparatuses) having hardware and/or software configured to perform one or more portions of the process flow 200. Further, in some embodiments, the apparatus having the process flow 200 is also configured to perform the process flow 100 and/or any other process flow described and/or contemplated herein. Also, it will be understood that the process flow 200 includes many of the same portions as the process flow 100. Accordingly, some of the description of process flow 100 also applies to at least some of process flow 200.

As shown in FIG. 2, the apparatus having the process flow 200 is configured to receive transaction information associated with a transaction, where the transaction involves a transaction machine, a prepaid card account, and a holder of the prepaid card account, as represented by block 110 of the process flow 200. As represented by block 120, the apparatus is also configured to determine, based at least partially on the transaction information, that the transaction involves the prepaid card account. In addition, as represented by block 130, the apparatus having the process flow 200 is configured to determine that the prepaid card account has a budget category. Also, as represented by block 140, the apparatus is configured to determine, based at least partially on the transaction information, that the transaction applies to the budget category. As represented by block 250, the apparatus is configured to determine that the budget category has a spending limit. As represented by block 260, the apparatus is further configured to determine, based at least partially on the transaction information, that the spending limit will be exceeded as a result of the transaction. Further, as represented by block 270, the apparatus is configured to decline the transaction based at least partially on determining that the spending limit will be exceeded. In addition, as represented by block 280, the apparatus is configured to send an alert to the holder based at least partially on declining the transaction and/or determining that the spending limit will be exceeded. For simplicity, it will be understood that the portion represented by block 260 is sometimes referred to herein as the "limit determination."

Regarding block 280, in some embodiments, the apparatus is configured to generate and/or send the alert to the holder, where the alert: (a) identifies the prepaid card account; (b) describes the transaction (e.g., type, amount, date/time, etc.); (c) identifies the affected budget category (and/or all of the budget categories associated with the prepaid card account); (d) identifies the spending limit and/or spending threshold for the affected budget category (and/or for all of the budget categories); (e) indicates that the transaction would have applied to the budget category (and/or why); (f) indicates that, as a result of the transaction, the spending limit for the affected budget category would have been exceeded; (g) indicates that the transaction was declined; (h) identifies the total balance for the prepaid card account before the transaction; (i) identifies the balance for the affected budget category before the transaction; and/or (j) prompts the holder to access a mobile banking account and/or to reload the prepaid card account with funds. For example, in some embodiments, where the prepaid card account has a transportation budget category and a $250 spending limit for that transportation budget category, the alert is a text message, email, or notification that states "Regarding Your Prepaid Card Account, Your Transportation Transaction Has Been Declined Because Your Transportation Budget Category Spending Limit Would Have Been Exceeded As A Result of the Transportation Transaction." In some embodiments, the alert is embodied as a "push" communication delivered to a mobile device, personal computer, online banking account, etc. associated with and/or accessible to the holder.

Of course, it will be understood that the embodiment illustrated in FIG. 2 is merely exemplary and that other embodiments may vary without departing from the scope and spirit of the present invention. In addition, the apparatus having the process flow 200 can be configured to perform one or more portions of the process flow 200 in real time, in substantially real time, and/or at one or more predetermined times. The apparatus having the process flow 200 may be configured to perform any of the portions of the process flow 200 represented by blocks 110-280 upon or after one or more triggering events (which, in some embodiments, is the performance of one or more of the other portions of the process flow 200). In addition, in some embodiments, the apparatus having the process flow 200 (and/or a user thereof) is configured to perform one or more portions (or combinations of portions) of the process flow 200, from start to finish, within moments, seconds, and/or minutes (e.g., within approximately 1-15 minutes, etc.).

Referring now to FIG. 3, a more-detailed process flow 300 for providing one or more prepaid card account services is provided, in accordance with an embodiment of the present invention. It will be understood that the process flow 300 illustrated in FIG. 3 represents an example embodiment of the process flow 100 and/or process flow 200 described in connection with FIGS. 1 and/or 2. In some embodiments, one or more portions of the process flow 300 are performed by an apparatus having hardware and/or software configured to perform one or more portions of the process flow 300. In this example embodiment, the apparatus having the process flow 300 is maintained by a bank for the benefit of its customers. In addition, the customer referred to in the process flow 300 is a customer of the bank. Further in this example embodiment, the prepaid card account referred to in the process flow 300 is an account held by the customer and maintained by the bank.

As represented by block 305, the bank customer opens a prepaid card account. For example, in some embodiments, the customer opening the prepaid card account includes purchasing a prepaid card associated with the prepaid card account at a retail store. As another example, the customer opening the prepaid card account includes registering and/or activating the prepaid card and/or prepaid card account with the financial institution that maintains the prepaid card account. As still another example, in some embodiments, the customer opening the prepaid card account includes signing up for the prepaid card account via, for example, an online banking account and/or a financial institution website. As yet another example, in some embodiments, the customer opening the prepaid card account includes being issued, in the customer's name, a prepaid card associated with the prepaid card account.

As represented by block 310, the apparatus having the process flow 300 prompts the customer to select one or more budget categories for the prepaid card account. For example, in some embodiments, the apparatus presents a graphical user interface (GUI) to the customer, where the GUI presents a plurality of budget categories from which the customer can select, including, for example, restaurants, gas, entertainment, groceries, and the like. As represented by block 315, the apparatus having the process flow 300 is also configured to prompt the customer to select a spending limit and a spending threshold for each selected budget category. For example, in some embodiments, the apparatus prompts the customer to select a restaurant budget category and a spending limit for the restaurant budget category that is not to exceed $300.

After being prompted, the customer selects one or more budget categories for the prepaid card account, as well as a spending limit and a spending threshold for each of those selected budget categories, as represented by block 320. Then, as represented by block 325, the apparatus having the process flow 300 stores information associated with the selected budget categories, limits, and thresholds in an account profile associated with the customer's prepaid card account. Also, sometime after the customer opens the prepaid card account, the customer loads the prepaid card account with funds, as represented by block 330. Sometime after the customer loads the prepaid card account with funds, the customer approaches a transaction machine (e.g., POS device, ATM, kiosk, etc.) to engage in a transaction using the prepaid card account, as represented by block 335. In some embodiments, as represented by block 340, the customer is authenticated at the transaction machine. For example, in some embodiments, the transaction machine (and/or the apparatus having the process flow 300) authenticates the customer based at least partially on a PIN, username, password, account number, and/or other credential the customer presents to the transaction machine (and/or apparatus). In some embodiments, the prepaid card account is associated with a PIN unique to the prepaid card account and/or to the prepaid card account holder (e.g., the customer), such that the prepaid card and/or the prepaid card account cannot be used to engage in a transaction unless the PIN is provided to the transaction machine (and/or to the apparatus having the process flow 300).

After the customer is authenticated at the transaction machine, the transaction machine sends an authorization request associated with the transaction to the apparatus having the process flow 300, as represented by block 345. After receiving the authorization request and/or based at least partially on the transaction information therein, the apparatus determines that the transaction applies to a budget category associated with the prepaid card account, as represented by block 350. In some embodiments, the apparatus is configured to make the budget category determination based at least partially on one or more merchant category codes associated with one or more merchants involved in the transaction. For example, in some embodiments, the authorization request includes information associated with a merchant, the merchant involved in the transaction is associated with the merchant category code "DDDD" for Dry Cleaners, and the apparatus determines, based at least partially on the merchant category code, that transaction applies to a clothing budget category.

After making the budget category determination, the apparatus having the process flow 300 must determine whether a spending limit associated with the budget category will be exceeded as a result of the transaction, as represented by block 355. If yes, then the apparatus is configured to send an alert to the customer that indicates, for example, that the transaction will be declined because the spending limit for the affected budget category would have been exceeded, as represented by block 360. In addition, the apparatus is also configured to decline the transaction based at least partially on determining that the spending limit would have been exceeded as a result of the transaction, as represented by block 365. After the customer receives the alert and/or after the transaction is declined, the customer may reload his prepaid card account (e.g., reload the entire prepaid card account, reload only the affected budget category, etc.), as represented by block 370.

Referring back to block 355, if the apparatus determines that the spending limit for the affected budget category will not be exceeded as a result of the transaction, then the apparatus is configured to authorize the transaction, as represented by block 375. Thereafter, the transaction is completed (e.g., purchase transaction is completed, ATM withdrawal transaction dispenses cash, etc.), and the customer leaves the transaction machine, as represented by block 380. In addition to authorizing the transaction, the apparatus having the process flow 300 determine whether the spending threshold for the budget category has been met, as represented by block 385. If no, then the apparatus updates information (e.g., transaction history, budget category balance, etc.) in the account profile based at least partially on the transaction, as represented by block 390. However, if the apparatus determines that the spending threshold will be met, then the apparatus generates and sends an alert to the customer that, for example, indicates that the spending threshold has been met, what the spending threshold is, what the spending limit is, what the current budget category balance is, and/or the like, as represented by block 395. In addition to sending the alert, the apparatus updates information (e.g., records that an alert was generated and sent to the customer as a result of the transaction, etc.) in the account profile based at least partially on the transaction, as represented by block 390. Further, after receiving alert, the customer may reload his prepaid card account (e.g., reload the affected budget category), as represented by block 370.

Of course, it will be understood that the embodiment illustrated in FIG. 3 is merely exemplary and that other embodiments may vary without departing from the scope and spirit of the present invention. In addition, the apparatus having the process flow 300 can be configured to perform one or more portions of the process flow 300 in real time, in substantially real time, and/or at one or more predetermined times. The apparatus having the process flow 300 may be configured to perform any of the portions of the process flow 300 represented by blocks 305-395 upon or after one or more triggering events (which, in some embodiments, is the performance of one or more of the other portions of the process flow 300). In addition, in some embodiments, the apparatus having the process flow 300 (and/or a user thereof) is configured to perform one or more portions (or combinations of portions) of the process flow 300, from start to finish, within moments, seconds, and/or minutes (e.g., within approximately 1-15 minutes, etc.).

Referring now to FIG. 4, a system 400 is illustrated for providing one or more prepaid cards, prepaid card accounts, and/or prepaid card account services, in accordance with an embodiment of the present invention. As illustrated, the system 400 includes a network 410, a user interface apparatus 420, an account apparatus 430, a mobile device 440, and a transaction machine 450. FIG. 4 also shows an account holder 402, a prepaid card 407, and an account profile 404. It will be understood that, in this example embodiment, the prepaid card 407 is associated with a prepaid card account that is held by the account holder 402 and maintained by a bank. The account profile 404 is associated with the prepaid card account and is stored in the account datastore 438 of the account apparatus 430. Also as shown, the account profile 404 stores prepaid card account information 404A; budget category, spending threshold, and spending limit information 404B; and alert preference information 404C. As shown, in this example embodiment, the holder 402 has access to the user interface apparatus 420 (e.g., personal computer, mobile phone, PDA, banking center kiosk, ATM, etc.), the mobile device 440 (e.g., mobile phone, portable gaming device, etc.), the transaction machine 450 (e.g., POS device, ATM, personal computer, mobile phone, etc.), and the prepaid card 407. In addition, in this example embodiment, the user interface apparatus 420 and the mobile device 440 are maintained by the account holder 402, the transaction machine 450 is maintained by a merchant, and the account apparatus 430 is maintained by the same bank that maintains the holder's 402 prepaid card account.

As shown in FIG. 4, the user interface apparatus 420, the account apparatus 430, the mobile device 440, and the transaction machine 450 are each operatively and selectively connected to the network 410, which may include one or more separate networks. The network 410 may include one or more payment networks (e.g., interbank networks, payment networks, any wireline and/or wireless network over which payment information is sent, etc.), telephone networks (e.g., cellular networks, CDMA networks, any wireline and/or wireless network over which communications to telephones and/or mobile phones are sent, etc.), local area networks (LANs), wide area networks (WANs), global area networks (GANs) (e.g., the Internet, etc.), and/or one or more other telecommunications networks. It will also be understood that the network 410 may be secure and/or unsecure and may also include wireless and/or wireline technology.

The user interface apparatus 420 may include any computerized apparatus that can be configured to perform any one or more of the functions of the user interface apparatus 420 described and/or contemplated herein. It will also be understood that the user interface apparatus 420 can include and/or be embodied as any apparatus described and/or contemplated herein. It will further be understood that the user interface apparatus 420 can initiate, perform, complete, and/or otherwise facilitate any transaction described and/or contemplated herein as being initiated, performed, and/or otherwise facilitated by an apparatus. For example, in some embodiments, the user interface apparatus 420 includes and/or is embodied as a personal computer, PDA, mobile phone, gaming device, ATM, banking center kiosk, computer system, front end system, network device, and/or the like. As another example, in some embodiments, the user interface apparatus 420 is configured to initiate, perform, complete, and/or otherwise facilitate one or more financial and/or non-financial transactions, including, for example, purchasing, renting, selling, and/or leasing goods and/or services (e.g., groceries, stamps, tickets, gift certificates, DVDs, etc.); withdrawing cash; making deposits (e.g., cash, checks, etc.); making payments (e.g., paying telephone bills, sending remittances, etc.); selecting one or more budget categories, spending limits, spending thresholds, and/or alert preferences; loading and/or reloading funds onto prepaid card accounts; accessing the Internet; and/or the like.

In some embodiments, the user interface apparatus 420 (and/or one or more other portions of the system 400) requires its users to authenticate themselves to the user interface apparatus 420 before the user interface apparatus 420 will initiate, perform, complete, and/or facilitate a transaction. For example, in some embodiments, the user interface apparatus 420 (and/or the interface application 427) is configured to authenticate a user based at least partially on an ATM/debit/credit card, loyalty/rewards/club card, smart card, token (e.g., USB token, etc.), username/password, personal identification number (PIN), biometric information, and/or one or more other credentials that the user presents to the user interface apparatus 420. In some embodiments, the one or more credentials may be associated with the prepaid card and/or prepaid card account (e.g., a PIN associated with the prepaid card and/or prepaid card account). Additionally or alternatively, in some embodiments, the user interface apparatus 420 is configured to authenticate a user by using one-, two-, or multi-factor authentication. For example, in some embodiments, where the user interface apparatus 420 is embodied as an ATM, the user interface apparatus 420 may require two-factor authentication, such that the holder 402 must provide a valid prepaid card and enter the correct PIN associated with the prepaid card in order to authenticate the holder 402 to the user interface apparatus 420.

As illustrated in FIG. 4, in accordance with some embodiments of the present invention, the user interface apparatus 420 includes a communication interface 422, a processor 424, a memory 426 having an interface application 427 stored therein, and a user interface 429. In such embodiments, the processor 424 is operatively and selectively connected to the communication interface 422, the user interface 429, and the memory 426.

Each communication interface described herein, including the communication interface 422, generally includes hardware, and, in some instances, software, that enables a portion of the system 400, such as the user interface apparatus 420, to send, receive, and/or otherwise communicate information to and/or from the communication interface of one or more other portions of the system 400. For example, the communication interface 422 of the user interface apparatus 420 may include a modem, network interface controller (NIC), near field communication (NFC) interface, network adapter, network interface card, and/or some other electronic communication device that operatively connects the user interface apparatus 420 to another portion of the system 400, such as, for example, the account apparatus 430.

Each processor described herein, including the processor 424, generally includes circuitry for implementing the audio, visual, and/or logic functions of that portion of the system 400. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the interface application 427 of the memory 426 of the user interface apparatus 420.

Each memory device described herein, including the memory 426 for storing the interface application 427 and other information, may include any computer-readable medium. For example, the memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of portions of information used by the apparatus in which it resides to implement the functions of that apparatus.

As shown in FIG. 4, the memory 426 includes the interface application 427. It will be understood that the interface application 427 can be operable (e.g., usable, executable, etc.) to initiate, perform, complete, and/or facilitate one or more portions of any embodiment described and/or contemplated herein, such as, for example, one or more portions of the process flows 100, 200, and/or 300 described herein and/or one or more portions of the process flow described in connection with FIG. 5. For example, in some embodiments, the interface application 427 is operable to present a GUI (e.g., browser screen, web page) to the holder 402 via the user interface 429, where the GUI enables and/or prompts the holder to open a prepaid card account, select one or more alert preferences (e.g., text message, email, phone call, time preferences, etc.) for the prepaid card account, select one or more budget categories for that prepaid account, and/or select a spending limit and/or a spending threshold for those one or more of the budget categories. As another example, in some embodiments, the interface application 427 is operable to receive information indicating that the holder 402 has selected one or more budget categories, spending limits, and/or spending thresholds. In some embodiments, the interface application 427 is operable to set and/or modify one or more budget categories, spending limits, and/or spending thresholds associated with a prepaid card account, for example, based at least partially on the holder's 402 selections. In some embodiments, the interface application 427 is also operable to enable the holder 402 to load and/or reload the prepaid card account with funds. Still further, in some embodiments, the interface application 427 is operable to access an electronic banking account (e.g., online banking account, mobile banking account, etc.) associated with the prepaid card account and/or to enable a prepaid card account holder to view information associated with the prepaid card account (e.g., transaction history, current budget categories, spending limits, spending thresholds, etc.).

In some embodiments, where the user interface apparatus 420 includes and/or is embodied as an ATM, the interface application 427 is configured to execute on the ATM in order to initiate, perform, complete, and/or facilitate, for example, one or more redemption transactions, cash withdrawals, deposits, and/or the like. In other embodiments, where the user interface apparatus 420 includes and/or is embodied as a mobile phone, the interface application 427 is configured to execute on the mobile phone in order to access a mobile banking account and/or initiate, perform, complete, and/or facilitate, for example, one or more redemption transactions, funds transfers, etc. In still other embodiments, where the user interface apparatus 420 includes and/or is embodied as a personal computer, the interface application 427 is configured to execute on the personal computer, and, in some embodiments, the interface application 427 is embodied as a web browser (i.e., for navigating the Internet, accessing an online banking account, etc.) that is operable to initiate, perform, complete, and/or otherwise facilitate one or more redemption transactions, as well as other financial and/or non-financial transactions.

In some embodiments, the interface application 427 is operable to enable the holder 402 and/or user interface apparatus 420 to communicate with one or more other portions of the system 400, and/or vice versa. In some embodiments, the interface application 427 includes one or more computer-executable program code portions for causing and/or instructing the processor 424 to perform one or more of the functions of the interface application 427 and/or user interface apparatus 420 described and/or contemplated herein. In some embodiments, the interface application 427 includes and/or uses one or more network and/or system communication protocols.

As shown in FIG. 4, the user interface apparatus 420 also includes the user interface 429. It will be understood that the user interface 429 (and any other user interface described and/or contemplated herein) can include and/or be embodied as one or more user interfaces. It will also be understood that, in some embodiments, the user interface 429 includes one or more user output devices for presenting information and/or one or more items to the transaction machine user (e.g., the holder 402, etc.), such as, for example, one or more displays, speakers, receipt printers, dispensers (e.g., cash dispensers, ticket dispensers, merchandise dispensers, etc.), and/or the like. In some embodiments, the user interface 429 additionally or alternatively includes one or more user input devices, such as, for example, one or more buttons, keys, dials, levers, directional pads, joysticks, keyboards, mouses, accelerometers, controllers, microphones, touchpads, touchscreens, haptic interfaces, styluses, scanners, biometric readers, motion detectors, cameras, card readers (e.g., for reading the magnetic strip on magnetic cards such as ATM, debit, credit, and/or bank cards, etc.), deposit mechanisms (e.g., for depositing checks and/or cash, etc.), and/or the like for receiving information from one or more items and/or from the transaction machine user (e.g., the holder 402, etc.). In some embodiments, the user interface 429 and/or the user interface apparatus 420 includes one or more vaults, security sensors, locks, and/or anything else typically included in and/or near a transaction machine.

FIG. 4 also illustrates an account apparatus 430, in accordance with an embodiment of the present invention. The account apparatus 430 may include any computerized apparatus that can be configured to perform any one or more of the functions of the account apparatus 430 described and/or contemplated herein. It will also be understood that the account apparatus 430 can include and/or be embodied as any apparatus described and/or contemplated herein. It will further be understood that the account apparatus 430 can initiate, perform, complete, and/or otherwise facilitate any transaction described and/or contemplated herein as being initiated, performed, and/or otherwise facilitated by an apparatus. In some embodiments, the account apparatus 430 includes and/or is embodied as one or more servers, engines, mainframes, computer systems, personal computers, ATMs, network devices, front end systems, back end systems, and/or the like. In some embodiments, such as the one illustrated in FIG. 4, the account apparatus 430 includes a communication interface 432, a processor 434, and a memory 436, which includes an account application 437 and an account datastore 438 stored therein. As shown, the communication interface 432 is operatively and selectively connected to the processor 434, which is operatively and selectively connected to the memory 436.

The account application 437 can be operable (e.g., usable, executable, etc.) to initiate, perform, complete, and/or facilitate any one or more portions of the process flows 100, 200, and/or 300 described herein and/or one or more portions of the process flow described in connection with FIG. 5. For example, in some embodiments, the account application 437 is operable to receive transaction information associated with a transaction. As another example, in some embodiments, the account application 437 is operable to determine, based at least partially on the transaction information, that the transaction involves a prepaid card account (e.g., the prepaid card account held by the holder 402 and associated with the prepaid card 407). As still another example, in some embodiments, the account application 437 is operable to determine that a prepaid card account has one or more budget categories, and/or that each budget category has a spending limit and/or a spending threshold. Still further, as another example, in some embodiments, the account application 437 is operable to determine, based at least partially on transaction information, that a transaction applies to a budget category associated with a prepaid card account. In some embodiments, the account application 437 is operable to determine, based at least partially on transaction information associated with a transaction, that a spending limit associated with a budget category will be exceeded as a result of the transaction and/or that a spending threshold will be (or has been) met as a result of the transaction. Still further, in some embodiments, the account application 437 is operable to decline and/or authorize a transaction. Additionally or alternatively, in some embodiments, the account application 437 is operable to generate and/or send alerts to holders (e.g., the holder 302 via the mobile device 440) that indicate whether a transaction has been authorized or declined, whether a spending threshold has been met as a result of a transaction, and/or whether a spending limit would have been exceeded as a result of a transaction.

Further, in some embodiments, the account application 437 is operable to present a GUI (e.g., browser screen, web page) to the holder 402 via the user interface 429 of the user interface apparatus 420, where the GUI enables and/or prompts the holder to open a prepaid card account, select one or more budget categories for that prepaid account, and/or select a spending limit and/or a spending threshold for those one or more of the budget categories. As another example, in some embodiments, the account application 437 is operable to receive information indicating that the holder 402 has selected one or more budget categories, spending limits, and/or or spending thresholds. In some embodiments, the account application 437 is operable to set and/or modify one or more budget categories, spending limits, and/or spending thresholds associated with a prepaid card account, for example, based at least partially on the holder's 402 selections. In some embodiments, the account application 437 is also operable to load and/or reload the prepaid card account with funds (and/ to enable the holder 402 to do the same).

In some embodiments, the account application 437 is operable to enable the account apparatus 430 to communicate with one or more other portions of the system 400, such as, for example, the account datastore 438, the transaction machine 450, the mobile device 440, and/or the user interface apparatus 420, and/or vice versa. In addition, in some embodiments, the account application 437 is operable to initiate, perform, complete, and/or otherwise facilitate one or more redemption transactions, as well as one or more other financial and/or non-financial transactions. In some embodiments, the account application 437 includes one or more computer-executable program code portions for causing and/or instructing the processor 434 to perform one or more of the functions of the account application 437 and/or the account apparatus 430 that are described and/or contemplated herein. In some embodiments, the account application 437 includes and/or uses one or more network and/or system communication protocols.

In addition to the account application 437, the memory 436 also includes the account datastore 438. It will be understood that the account datastore 438 can be configured to store any type and/or amount of information. As shown, the account datastore 438 stores the account profile 404, which includes prepaid card account information 404A, budget category, threshold, and limit information 404B, and alert preference information 404C. The account information 404A may include any information associated with the prepaid card account held by the holder 402, including, for example, transaction information associated with one or more transactions involving the prepaid card account (e.g., date/time, description, transaction amount, merchant category codes, etc.), information associated with one or more account holders (e.g., holder 402), information associated with one or more account preferences, billing information, and/or the like. The budget category, threshold, and limit information 404B may include any information associated with the one or more budget categories for the prepaid card account, and/or any information associated with a spending limit and/or a spending threshold associated with each of those one or more budget categories. For example, in some embodiments, the information 404B may indicate that the holder's 402 prepaid card account has a gas budget category, a $150 spending limit for that gas budget category, and a $125 spending threshold for that gas budget category. The alert preference information 404C may include any information associated with the holder's 402 preferred method of receiving one or more alerts regarding the prepaid card account, budget categories, spending thresholds, and/or spending limits. For example, in some embodiments, the information 404C may indicate that the holder 402 prefers to be contacted via text message, and the information 404C may include the holder's preferred mobile phone number for receiving those text messages. The information 404C may also indicate when the holder prefers to be notified (e.g., immediately after the transaction, during the transaction, during business hours, on the weekends, etc.).

In addition to the account profile 404, the account datastore 438 may include information associated with one or more account holders (i.e., other than the holder 402), account profiles (i.e., other than the account profile 404), financial accounts (i.e., other than the prepaid card account held by the holder 402), electronic banking accounts (e.g., online banking accounts, mobile banking accounts, text banking accounts, etc.), user interface apparatuses, and/or the like. Also, the account datastore 438 may include any one or more storage devices, including, but not limited to, datastores, databases, and/or any of the other storage devices typically associated with a computer system. It will also be understood that these datastores may store information in any known way, such as, for example, by using one or more computer codes and/or languages, alphanumeric character strings, data sets, figures, tables, charts, links, documents, and/or the like. Further, in some embodiments, the account datastore 438 includes information associated with one or more applications, such as, for example, the account application 437 and/or the interface application 427. In some embodiments, the account datastore 438 provides a real-time or near real-time representation of the information stored therein, so that, for example, when the processor 434 accesses the account datastore 438, the information stored therein is current or nearly current. Although not shown, in some embodiments, the user interface apparatus 420, the mobile device 440, and/or the transaction machine 450 may each include a datastore that is configured to store information associated with those respective apparatuses. It will be understood that these datastores can store information in any known way, can include information associated with anything shown in FIG. 4, and/or can be configured similar to the account datastore 438.

Referring now to FIG. 4A, a block diagram is provided that illustrates the mobile device 440 of FIG. 4 in more detail, in accordance with an embodiment of the invention. In some embodiments, the mobile device 440 is a mobile phone, but in other embodiments, the mobile device 440 can include and/or be embodied as any other mobile device described and/or contemplated herein, such as, for example, a portable gaming device, PDA, tablet computer, and/or the like. The mobile device 440 generally includes a processor 444 operatively connected to such devices as a memory 446, user interface 449 (i.e., user output devices 449A and user input devices 449B), a communication interface 442, a power source 445, a clock or other timer 443, a camera 441, and a positioning system device 490.

The processor 444 may include the functionality to encode and interleave messages and data prior to modulation and transmission. The processor 444 can additionally include an internal data modem. Further, the processor 444 may include functionality to operate one or more software programs, which may be stored in the memory 446. For example, the processor 444 may be capable of operating a connectivity program, such as a web browser application 448. The web browser application 448 may then allow the mobile device 440 to transmit and receive web content, such as, for example, location-based content and/or other web page content, according to a Wireless Application Protocol (WAP), Hypertext Transfer Protocol (HTTP), and/or the like.

The processor 444 is configured to use the communication interface 442 to communicate with one or more other devices on the network 410. In this regard, the communication interface 442 includes an antenna 476 operatively coupled to a transmitter 474 and a receiver 472 (together a "transceiver"). The processor 444 is configured to provide signals to and receive signals from the transmitter 474 and receiver 472, respectively. The signals may include signaling information in accordance with the air interface standard of the applicable cellular system of the wireless telephone network 410. In this regard, the mobile device 440 may be configured to operate with one or more air interface standards, communication protocols, modulation types, and access types. By way of illustration, the mobile device 440 may be configured to operate in accordance with any of a number of first, second, third, and/or fourth-generation communication protocols and/or the like. For example, the mobile device 440 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 440 may also be configured to operate in accordance with non-cellular communication mechanisms, such as via a wireless local area network (WLAN) or other communication/data networks.

The communication interface 442 may also include a near field communication (NFC) interface 470. As used herein, the phrase "NFC interface" generally refers to hardware and/or software that is configured to contactlessly and/or wirelessly send and/or receive payment information, account information, and/or other information over relatively short ranges (e.g., within four inches, within three feet, within fifteen feet, etc.). The NFC interface 470 may include a smart card, key card, proximity card, Bluetooth® device, radio frequency identification (RFID) tag and/or reader, transmitter, receiver, and/or the like. In some embodiments, the NFC interface 470 communicates information via radio, infrared (IR), and/or optical transmissions. In some embodiments, the NFC interface 470 is configured to operate as an NFC transmitter and/or as an NFC receiver (e.g., an NFC reader, etc.). In some embodiments, the NFC interface 470 enables the mobile device 440 to operate as a mobile wallet. Also, it will be understood that the NFC interface 470 may be embedded, built, carried, and/or otherwise supported in and/or on the mobile device 440. In some embodiments, the NFC interface 470 is not supported in and/or on the mobile device 440, but the NFC interface 470 is otherwise operatively connected to the mobile device 440 (e.g., where the NFC interface 470 is a peripheral device plugged into the mobile device 440, etc.). Other apparatuses having NFC interfaces mentioned herein may be configured similarly.

In some embodiments, the NFC interface 470 of the mobile device 440 is configured to contactlessly and/or wirelessly communicate information to and/or from a corresponding NFC interface of another apparatus (e.g., the transaction machine 450, etc.). For example, in some embodiments, the mobile device 440 is a mobile phone, the NFC interface 470 is a smart card having account information stored therein, and the transaction machine 450 is a POS device having an NFC reader operatively connected thereto. In such embodiments, when the mobile phone and/or smart card is brought within a relatively short range of the NFC reader, the smart card is configured to wirelessly and/or contactlessly send the account information to the NFC reader in order to, for example, initiate, perform, complete, and/or otherwise facilitate a transaction.

In addition to the NFC interface 470, the mobile device 440 can have a user interface 449 that is, like other user interfaces described herein, made up of one or more user output devices 449A and/or user input devices 449B. The user output devices 449A include a display 480 (e.g., a liquid crystal display and/or the like) and a speaker 482 and/or other audio device, which are operatively coupled to the processor 444. The user input devices 449B, which allow the mobile device 440 to receive data from a user such as the holder 402, may include any of a number of devices allowing the mobile device 440 to receive data from a user, such as a keypad, keyboard, touchscreen, touchpad, microphone, mouse, joystick, other pointer device, button, soft key, and/or other input device(s). The user interface 449 may also include a camera 441, such as a digital camera.

In some embodiments, the mobile device 440 also includes a positioning system device 490 that can be used to determine the location of the mobile device 440. For example, the positioning system device 490 may include a GPS transceiver. In some embodiments, the positioning system device 490 is at least partially made up of the antenna 476, transmitter 474, and receiver 472 described above. For example, in one embodiment, triangulation of cellular signals may be used to identify the approximate location of the mobile device 440. In other embodiments, the positioning system device 490 includes a proximity sensor and/or transmitter, such as an RFID tag, that can sense or be sensed by devices known to be located proximate a merchant and/or other location to determine that the mobile device 440 is located proximate these known devices.

The mobile device 440 further includes a power source 445, such as a battery, for powering various circuits and other devices that are used to operate the mobile device 440. Embodiments of the mobile device 440 may also include a clock or other timer 443 configured to determine and, in some cases, communicate actual or relative time to the processor 444 or one or more other devices.

The mobile device 440 also includes a memory 446 operatively connected to the processor 444. As used herein, memory includes any computer readable medium (as defined herein) configured to store data, code, and/or other information. The memory 446 may include volatile memory, such as volatile Random Access Memory (RAM) including a cache area for the temporary storage of data. The memory 446 may also include non-volatile memory, which can be embedded and/or may be removable. The non-volatile memory can additionally or alternatively include an electrically erasable programmable read-only memory (EEPROM), flash memory or the like.

The memory 446 can store any of a number of applications which may include computer-executable instructions/code executed by the processor 444 to implement the functions of the mobile device 440 described herein. For example, the memory 446 may include such applications as a web browser application 448 and/or a mobile banking application 447. It will be understood that the web browser application 448 and/or the mobile banking application 447 can be, individually or collectively, operable (e.g., usable, executable, etc.) to initiate, perform, complete, and/or facilitate any one or more portions of the process flows 100, 200, and/or 300 described herein and/or one or more portions of the process flow described in connection with FIG. 5. For example, in some embodiments, the mobile banking application 447 (and/or the web browser application 448) is operable to receive an alert from the account apparatus 430, where the alert relates to a transaction, budget category, spending threshold, spending limit, and/or any information associated with a prepaid card account and/or transaction. As still another example, in some embodiments, the mobile banking application 447 (and/or the web browser application 448) is operable to enable the holder 402 to open a prepaid card account, to manage the prepaid card account (e.g., by selecting budget categories, spending limits, and/or spending thresholds for the prepaid card account), and/or to load and/or reload the prepaid card account with funds. In some embodiments, the mobile banking application 447 (and/or the web browser application 448) is operable to set and/or modify one or more budget categories, spending limits, and/or spending thresholds associated with the prepaid card account, for example, based at least partially on the holder's 402 selections. In addition, in some embodiments, the mobile banking application 447 (and/or the web browser application 448) is operable to access a mobile banking account associated with the prepaid card account and/or to view information associated with the prepaid card account (e.g., transaction history, current budget categories, spending limits, spending thresholds, etc.).

In some embodiments, these applications provide a graphical user interface (GUI) on the display 480 that allows the holder 402 to communicate with the mobile device 440, the transaction machine 450, the account apparatus 430, and/or one or more other portions of the system 400. In some embodiments, the holder 402 can use the mobile banking application 447 to access an electronic banking account (e.g., mobile banking account, etc.) that is associated with his prepaid card account. The memory 446 can also store any type and/or amount information used by the mobile device 440, and/or used by the applications and/or the devices that make up the mobile device 440 and/or that are in communication with the mobile device 440, to implement the functions of the mobile device 440 and/or the other systems described and/or contemplated herein. For example, in some embodiments, the memory 446 stores account information (e.g., routing and/or account numbers, account names, username/passwords, PINS, biometric information, etc.) associated with the holder 402.

The embodiments illustrated in FIGS. 4 and 4A are exemplary and other embodiments may vary. For example, in some embodiments, some or all of the portions of the system 400 are combined into a single portion. Specifically, in some embodiments, the user interface apparatus 420 and the mobile device 440 are combined into a single apparatus that is configured to perform all of the same functions of those separate portions as described and/or contemplated herein. Likewise, in some embodiments, some or all of the portions of the system 400 are separated into two or more distinct portions. In addition, the various portions of the system 400 may be maintained by the same or separate parties.

The system 400 and/or one or more portions of the system 400 may include and/or implement any embodiment of the present invention described and/or contemplated herein. For example, in some embodiments, the system 400 (and/or one or more portions of the system 400) is configured to implement any one or more embodiments of the process flow 100 described and/or contemplated herein in connection with FIG. 1, any one or more embodiments of the process flow 200 described and/or contemplated herein in connection with FIG. 2, any one or more embodiments of the process flow 300 described and/or contemplated herein in connection with FIG. 3, and/or any one or more embodiments of the process flow described and/or contemplated herein in connection with FIG. 5.

As a specific example, in accordance with an embodiment of the present invention, the account apparatus 430 is configured to: (a) receive, from the transaction machine 450, transaction information associated with a transaction, where the transaction involves the transaction machine 450, a prepaid card account (e.g., the account held by the holder 402 and associated with the prepaid card 407, etc.), and the holder 402, as represented by block 110 in FIG. 1; (b) determine, based at least partially on the transaction information, that the transaction involves the prepaid card account, as represented by block 120; (c) determine that prepaid card account has a budget category (e.g., by accessing information 404B in the account profile 404, etc.), as represented by block 130; (d) determine, based at least partially on the transaction information, that the transaction applies to the budget category (e.g., by comparing a merchant identified in the transaction information to a merchant category code associated with the budget category, etc.), as represented by block 140; (e) determine that the budget category has a spending threshold (e.g., by accessing information 404B in the account profile 404, etc.), as represented by block 150; (f) determine, based at least partially on the transaction information, that the spending threshold will be (or has been) met as a result of the transaction, as represented by block 160; and (g) generate and/or send an alert to the holder 402 (e.g., at the mobile device 440) based at least partially on the account apparatus 430 determining that the spending threshold will be (or has been) met, as represented by block 170. In accordance with some embodiments, the user interface apparatus 420, the account apparatus 430, the mobile device 440, and/or the transaction machine 450 are each configured to send and/or receive one or more instructions to and/or from each other, such that an instruction sent, for example, from the user interface apparatus 420 to the account apparatus 430 (and/or vice versa) can trigger the account apparatus 420 (and/or vice versa) to perform one or more portions of any one or more of the embodiments described and/or contemplated herein.

Referring now to FIG. 5, a mixed block and flow diagram of a system 500 for sending a spending threshold alert to a holder of a prepaid debit card account is provided, in accordance with an exemplary embodiment of the present invention. It will be understood that the system 500 illustrated in FIG. 5 represents an example embodiment of the process flow 100 described in connection with FIG. 1. As shown, the system 500 includes a POS device 501 (e.g., the transaction machine 450), a prepaid card account server 503 (e.g., the account apparatus 430), and a mobile phone 505 (e.g., the mobile device 440). The POS device 501, the prepaid card account server 503, and the mobile phone 505 may each include a communication interface, a user interface, a processor, a memory, an application, and/or a datastore, and those components may be operatively connected to each other.

In accordance with some embodiments, the POS device 501 and the mobile phone 505 are operatively and selectively connected to the prepaid card account server 503 via one or more networks. For example, in some embodiments, the POS device 501 is operatively connected to the prepaid card account server 503 via a payment network, and the mobile phone 505 is operatively connected to the prepaid card account server 503 via a telephone network. In addition, the POS device 501 and the mobile phone 505 are both accessible to the customer referred to in block 502. In this example embodiment, the POS device 501 is maintained by a café (e.g., a merchant), the prepaid card account server 503 is maintained by the customer's bank, and the mobile phone 505 is maintained by the customer. Also in this example embodiment, the customer is a holder of the prepaid debit card account (e.g., the holder 402) mentioned below, the bank maintains the prepaid debit card account, and the prepaid debit card account is associated with a prepaid debit card (e.g., the prepaid card 407). Further, it will be understood that the customer has already opened the prepaid debit card account and loaded the prepaid debit card account with funds before any portion of the process flow illustrated in FIG. 5 is performed.

As represented by block 502, the customer swipes the prepaid debit card at the POS device 501 to initiate a $20 purchase transaction at the café. As a result, the prepaid card account server 503 receives transaction information associated with the café transaction (e.g., via an authorization request), as represented by block 504. In this example embodiment, the transaction information includes information associated with the transaction amount (e.g., $20), the date/time of the transaction, the identity of the merchant involved in the transaction (e.g., café), and the like. As represented by block 506, the prepaid card account server 503 determines that the café is associated with the merchant category code "EEEE" for restaurants. As a result, as represented by block 508, the prepaid card account server 503 determines that the transaction applies to a restaurant budget category associated with the prepaid card account. Then, as represented by block 510, the server 503 determines that the restaurant budget category has a spending limit of $100 and a spending threshold of $85. The server 503 also determines that the customer has already spent $75 in the restaurant budget category (i.e., the customer is $25 away from the restaurant budget category spending limit before the café transaction and/or the restaurant budget category balance is $25 before the café transaction), as represented by block 512. As a result, the server 503 determines that the spending limit will not be exceeded as a result of the transaction (i.e., because $75 already spent+$20 café transaction=$95 total spent<$100 spending limit), as represented by block 514. Based at least partially on this determination, the server 503 authorizes the transaction and sends a notification of same to the POS device 501, as represented by block 516. Thereafter, the POS device 501 (and/or the café) completes the transaction, as represented by block 518.

In addition to determining that the customer's restaurant budget category spending limit will not be exceeded as a result of the transaction, the server 503 also determines that the customer's restaurant budget category spending threshold will be met as a result of the transaction (i.e., because $75 already spent+$20 café transaction=$95 total spent >$85 spending threshold), as represented by block 520. Thereafter, the server 503 generates and sends an alert to the customer based at least partially on the threshold determination, as represented by block 522. Also, in this example embodiment, the alert includes information that indicates to the customer that the restaurant budget category spending threshold has been met as a result of the café transaction. For example, in some embodiment, the server 503 generates and sends a text message to the customer at the mobile phone 505, where the text message states "Regarding Your Prepaid Debit Card Account, You Have Now Spent $95 of the $100 in Your Restaurant Budget," "Your Restaurant Budget Spending Limit is $100 and Your Restaurant Budget Balance is Now $5," "You Have Now Exceeded Your $85 Spending Threshold for Your Restaurant Budget," and/or "You Are Now $5 Away From the Spending Limit of Your Restaurant Budget." In some embodiments, the alert sent to the customer may additionally or alternatively include information associated with the café transaction, such as, for example, a text message that states "Your Prepaid Debit Card Account Was Just Used to Make a $20 Purchase at the Café Located at 123 Independence Boulevard."

After the alert is generated and sent by the server 503, the customer receives the alert at his mobile phone 505, as represented by block 524. Upon receiving the alert, the customer may use the mobile phone 505 to log in to a mobile banking account (e.g., via a mobile banking application executing on the phone 505) associated with the prepaid debit card account, as represented by block 526. In some embodiments, the customer is required to provide a PIN associated with the prepaid debit card and/or a username/password associated with the mobile banking account before being provided access to the mobile banking account. After logging in, the customer may reload the prepaid debit card account via the mobile banking account, as represented by block 528. For example, in some embodiments, the customer may transfer funds from his checking account (e.g., which, in some embodiments, is also accessible via the mobile banking account) to his prepaid debit card account. In some of these embodiments, the customer may designate which of the budget categories associated with his prepaid debit card account are to receive the funds. For example, in some embodiments, after the café transaction, the customer may transfer $95 from his checking account to his prepaid debit card account and designate that all $95 should be directed to the restaurant budget category. In such embodiments, the restaurant budget category balance would return to $100 after the funds are loaded onto the card and applied to the restaurant budget category. In other words, in this example, the customer will be $100 away from the $100 restaurant budget category spending limit after reloading the card. (In this example embodiment, the restaurant budget category spending limit is reached when the restaurant budget category balance is $0.)

Of course, the embodiment illustrated in FIG. 5 is merely exemplary and other embodiments may vary without departing from the scope and spirit of the present invention. For example, in some embodiments, one or more portions of the process flow being performed by the prepaid card account server 503 are performed instead by the POS device 501 and/or the mobile phone 505, and/or vice versa. Also, in some embodiments, one or more of the portions of the process flow represented by blocks 502-528 are triggered by one or more triggering events, which, in some embodiments, include the performance of one or more of the other portions of the process flow represented by blocks 502-528. Also, in some embodiments, the system 500 is configured to perform the entire process flow represented by blocks 502-528, from start to finish, within moments, seconds, and/or minutes. For example, in some embodiments, the prepaid card account server 503 generates and sends the alert to the customer at the mobile phone 505, as represented by block 522, within approximately 1-45 seconds of the server 503 receiving the transaction information from the POS device 501, as represented by block 504.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s)

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method comprising:
receiving transaction information associated with a transaction associated with a predetermined transaction type and a predetermined type of channel for performing the transaction, the predetermined transaction type comprising at least one of a withdrawal, a purchase, and a transfer;
determining, by a computer and based at least partially on the transaction information, that the transaction involves a prepaid card account, the prepaid card account comprising identification of the prepaid card account holder;
determining, by a computer, that the prepaid card account comprises a plurality of budget categories, each of the budget categories having a balance, wherein at least one of the plurality of budget categories comprises a withdrawal category;
determining, by a computer, that the transaction applies to one budget category of the plurality of budget categories based at least partially on the predetermined transaction type or the predetermined type of channel;
determining, by a computer, that the budget category comprises a spending limit and a spending threshold, wherein the spending limit comprises a total amount that can be spent in the budget category before transactions are declined and the spending threshold comprises a predetermined partial amount that can be spent in the budget category before an alert is sent to the holder, wherein the amount of the balance of the budget category is greater than the total amount of the spending limit and the total amount of the spending limit is greater than the predetermined partial amount of the spending threshold;
determining, by a computer and based at least partially on the transaction information, that the spending threshold will be or has been met as a result of the transaction;
sending, by a computer, an alert to a holder of the prepaid card account based at least partially on the determining that the threshold will be or has been met; and
loading, by a computer, funds provided by the holder to the prepaid card account, the funds being allocated across the budget categories proportional to spending limits of the budget categories.

2. The method of claim 1, wherein the alert comprises information indicating that the threshold will be or has been met.

3. The method of claim 1, further comprising:
determining, by a computer and based at least partially on the transaction information, that the spending limit will not be exceeded as a result of the transaction; and authorizing, by a computer, the transaction based at least partially on the determining that the spending limit will not be exceeded.

4. The method of claim 1, further comprising:
receiving second transaction information associated with a second transaction;
determining, by a computer and based at least partially on the second transaction information, that the second transaction involves the prepaid card account;
determining, by a computer and based at least partially on the second transaction information, that the second transaction applies to the budget category;
determining, by a computer, that the budget category comprises a spending limit;
determining, by a computer and based at least partially on the second transaction information, that the spending limit will be exceeded as a result of the second transaction; and
declining, by a computer, the second transaction based at least partially on the determining that the spending limit will be exceeded.

5. The method of claim 4, further comprising:
sending, by a computer, a second alert to the holder based at least partially on: (a) the declining the second transaction; or (b) the determining that the spending limit will be exceeded.

6. The method of claim 5, wherein the second alert comprises information indicating that the second transaction will be or has been declined because the spending limit would have been exceeded.

7. The method of claim 1, further comprising:
presenting, by a computer, a user interface to a holder of the prepaid card account, wherein the user interface enables the holder to select one or more spending thresholds for one or more budget categories for the prepaid card account, and wherein the presenting the user interface occurs before the receiving the transaction information;
receiving, from the holder and via the user interface, information indicating that the holder has selected the spending threshold for the budget category; and
storing information associated with the budget category and the spending threshold in an account profile associated with the prepaid card account.

8. The method of claim 7, wherein the user interface further enables the holder to select one or more spending limits for one or more budget categories, and wherein the receiving the information comprises receiving information indicating that the holder has selected a spending limit for the budget category, and wherein the storing the information comprises storing information associated with the spending limit in the account profile.

9. The method of claim 1, further comprising:
reloading, by a computer, the prepaid card account with funds provided by the holder, wherein the reloading occurs after the loading.

10. The method of claim 1, wherein the determining that the transaction applies to the budget category comprises:
determining, by a computer and based at least partially on the transaction information, that the transaction involves a merchant;
determining, by a computer, that the merchant is associated with a particular merchant category code; and
determining, by a computer, that the budget category includes any transactions associated with the particular merchant category code.

11. An apparatus comprising:
a communication interface configured to receive transaction information associated with a transaction associated with a predetermined transaction type and a predetermined type of channel for performing the transaction, the predetermined transaction type comprising at least one of a withdrawal, a purchase, and a transfer, wherein the transaction involves a prepaid card account, the prepaid card account comprising identification of the prepaid card account holder, wherein the prepaid card account comprises a plurality of budget categories, each of the budget categories having a balance, wherein at least one of the plurality of budge categories comprises a withdrawal category, and wherein each of the plurality of budget categories comprises a spending limit and a spending threshold, wherein the spending limit comprises a total amount that can be spent in the budget category before transactions are declined and the spending threshold comprises a predetermined partial amount that can be spent in the budget category before an alert is sent to the holder, wherein the amount of the balance of the budget category is greater than the total amount of the spending limit and the total amount of the spending limit is greater than the predetermined partial amount of the spending threshold; and
a processor operatively connected to the communication interface and configured to:
determine that the transaction applies to one budget category of the plurality of budget categories based at least partially one the predetermined transaction type or the predetermined type of channel;
determine that that spending limit will be exceeded as a result of the transaction;
decline the transaction based at least partially on the determining that the spending limit will be exceeded;
load funds provided by the holder to the prepaid card account, the funds being allocated across the budget categories proportional to spending limits of the budget categories; and
transfer at least a portion of the funds from the prepaid card account to a second account.

12. The apparatus of claim 11, wherein the processor is further configured to instruct the communication interface to send an alert to a holder of the prepaid card account, wherein the alert indicates that transaction will be or has been declined.

13. The apparatus of claim 11,
wherein the communication interface is further configured to receive second transaction information associated with a second transaction, wherein the second transaction involves a second prepaid card account, wherein the second prepaid card account comprises a second budget category, and wherein the second budget category comprises a second spending threshold, and
wherein the processor is further configured to:
determine that the second transaction applies to the second budget category;
determine that the second spending threshold will be or has been met as a result of the second transaction; and
instruct the communication interface to send an alert to a holder of the second prepaid card account, wherein the alert identifies the balance for the second budget category as a result of the second transaction.

14. The apparatus of claim 11,
wherein the communication interface is further configured to receive second transaction information associated with a second transaction, wherein the second transaction involves the prepaid card account, wherein the prepaid card account comprises a second budget category, and wherein the second budget category comprises a second spending limit, and wherein the processor is further configured to:
determine that the second spending limit will not be exceeded as a result of the second transaction; and
authorize the second transaction based at least partially on the determining that the second spending limit will not be exceeded.

15. The apparatus of claim 11, wherein the communication interface is further configured to:
present a user interface to a holder of the prepaid card account, wherein the user interface enables the holder to select one or more spending limits for one or more budget categories for the prepaid card account, and wherein the user interface is presented to the holder before the communication interface receives the transaction information; and
receive, via the user interface, the holder's selection for the spending limit, and
wherein the processor sets the spending limit for the budget category based at least partially on receiving the holder's selection.

16. The apparatus of claim 11, wherein the communication interface is further configured to:
present a user interface to a holder of the prepaid card account, wherein the user interface enables the holder to select one or more budget categories for the prepaid card account, and wherein the user interface is presented to the holder before the communication interface receives the transaction information; and
receive, via the user interface, information indicating that the holder has selected the budget category for the prepaid card account, and
wherein the processor establishes the budget category for the prepaid card account based at least partially on the receiving the information.

17. The apparatus of claim 11, wherein the processor is further configured to:
load the prepaid card account with funds provided by the holder; and
reload the prepaid card account with funds provided by the holder, wherein the processor reloads the prepaid card account after loading the prepaid card account.

18. A computer program product comprising a non-transitory computer-readable medium, wherein the non-transitory computer-readable medium comprises one or more computer-executable program code portions that, when executed by a computer, cause the computer to:
present a user interface to a holder of a prepaid card account, the prepaid card account comprising identification of the prepaid card account holder, wherein the user interface enables the holder to select one or more budget categories for the prepaid card account and one or more spending limits for the one or more budget categories, each of the budget categories having a balance, wherein at least one of the one or more budget categories comprises a withdrawal category;
receive, via the user interface, information indicating that the holder has selected a budget category for the prepaid card account and a spending limit for the budget category and a spending threshold for the budget category, wherein the spending limit comprises a total amount that can be spent in the budget category before transactions are declined and the spending threshold comprises a predetermined partial amount that can be spent in the budget category before an alert is sent to the holder, wherein the amount of the balance of the budget category is greater than the total amount of the spending limit and the total amount of the spending limit is greater than the predetermined partial amount of the spending threshold;
store information associated with the selected budget category and spending limit in an account profile associated with the prepaid card account;
receive transaction information associated with a transaction associated with a predetermined transaction type and a predetermined type of channel for performing the transaction, wherein the transaction involves the prepaid card account, and wherein the computer receives the transaction information after storing the information; and
determine that the transaction applies to the selected budget category based at least partially on the predetermined transaction type or the predetermined type of channel;
determine that the selected spending limit for the selected budget category will be exceeded as a result of the transaction;
decline the transaction based at least partially on determining that the selected spending limit will be exceeded;
load funds provided by the holder to the prepaid card account, the funds being allocated across the budget categories proportional to spending limits of the budget categories; and
transfer at least a portion of the funds from the prepaid card account to a second account.

19. The computer program product of claim 18, wherein the one or more computer-executable program code portions, when executed by the computer, cause the computer to:
send an alert to the holder that indicates that: (a) the transaction will be or has been declined; or (b) the selected spending limit will be exceeded as a result of the transaction.

20. The computer program product of claim 18, wherein the one or more computer-executable program code portions, when executed by the computer, cause the computer to:
receive second transaction information associated with a second transaction, wherein the second transaction involves the prepaid card account;
determine that the second transaction applies to a second budget category associated with the prepaid card account, wherein the second budget category comprises a second spending limit;
determine that the second spending limit will not be exceeded as a result of the second transaction; and
authorize the second transaction based at least partially on determining that the second spending limit will not be exceeded.

21. The computer program product of claim 18, wherein the user interface enables the holder to load or reload the prepaid card account with funds via the user interface.

22. A method comprising:
receiving transaction information associated with a transaction, the transaction being associated with a predetermined transaction type and a predetermined type of channel for performing the transaction, wherein the transaction involves a prepaid card account, the prepaid card account comprising identification of the prepaid card account holder. wherein the prepaid card account comprises a plurality of budget categories, wherein at least one of the plurality of budget categories comprises a withdrawal category, and wherein each of the plurality of budget categories comprises a spending limit and a spending threshold, wherein the spending limit is greater than the spending threshold by a first amount and wherein each of the budget categories exceeds the spending limit by a second amount;

determining, by a computer, that the transaction applies to one budget category of the plurality of budget categories based at least partially on the predetermined transaction type or the predetermined type of channel;

determining, by a computer, that the spending limit will be exceeded as a result of the transaction; and declining, by a computer, the transaction based at least partially on the determining that the spending limit will be exceeded;

transferring, by a computer, at least a portion of the second amount from the prepaid card account to a second account; and loading, by a computer, funds provided by the holder to the prepaid card account, the funds being allocated across the budget categories proportional to spending limits of the budget categories.

23. The method of claim 22, further comprising:
sending, by a computer, an alert to a holder of the prepaid card account, wherein the alert indicates that the transaction will be or has been declined.

24. The method of claim 22, further comprising:
receiving second transaction information associated with a second transaction, wherein the second transaction involves the prepaid card account, wherein the prepaid card account comprises a second budget category, and wherein the second budget category comprises a spending threshold;
determining, by a computer, that the second transaction applies to the second budget category;
determining, by a computer, that the spending threshold will be or has been met as a result of the second transaction; and
sending, by a computer, an alert to a holder of the prepaid card account based at least partially on the determining that the spending threshold will be or has been met.

25. The method of claim 24, wherein the alert identifies the balance for the second budget category as a result of the second transaction.

26. The method of claim 22, further comprising:
receiving second transaction information associated with a second transaction, wherein the second transaction involves the prepaid card account, wherein the prepaid card account comprises a second budget category;
determining, by a computer, that the second transaction applies to the second budget category;
determining, by a computer, that the balance for the second budget category will be non-negative as a result of the second transaction; and
authorizing, by a computer, the transaction based at least partially on the determining that the balance will be non-negative.

27. The method of claim 22, further comprising:
presenting, by a computer, a user interface to a holder of the prepaid card account, wherein the user interface enables the holder to select one or more spending limits for one or more budget categories for the prepaid card account, and wherein the presenting the user interface occurs before the receiving the transaction information;
receiving, by a computer and from the holder and via the user interface, information indicating that the holder has selected the spending limit for the budget category; and
storing information associated with the budget category and the spending limit in an account profile associated with the prepaid card account.

28. The method of claim 22, further comprising:
loading, by a computer, the prepaid card account with funds provided by the holder; and
reloading, by a computer, the prepaid card account with funds provided by the holder, wherein the reloading occurs after the loading.

29. The method of claim 1, further comprising:
transferring, by a computer, at least a portion of the amount of the balance of the budget category that exceeds the total amount of the spending limit from the prepaid card account to a second account.

* * * * *